US012792369B1

(12) United States Patent
Fresa et al.

(10) Patent No.: US 12,792,369 B1
(45) Date of Patent: Nov. 10, 2026

(54) SYSTEM AND METHOD OF CUSTOMIZING AND CLONING A GRAPHIC USER INTERFACE FOR MONITORING AND MANAGING METRIC DATA OF CRYPTOCURRENCY MINERS IN REAL-TIME

(71) Applicants: Marc Fresa, Shelton, CT (US); Sveatoslav Grebenciucov, Tiraspol (MD)

(72) Inventors: Marc Fresa, Shelton, CT (US); Sveatoslav Grebenciucov, Tiraspol (MD)

( * ) Notice: Subject to any disclaimer, the term of this patent is extended or adjusted under 35 U.S.C. 154(b) by 244 days.

(21) Appl. No.: 18/444,475

(22) Filed: Feb. 16, 2024

Related U.S. Application Data

(60) Provisional application No. 63/446,583, filed on Feb. 17, 2023.

(51) Int. Cl.
*G06F 9/451* (2018.01)
*G06F 3/0482* (2013.01)
*G06F 3/0486* (2013.01)
*G06F 11/30* (2006.01)
*G09G 5/30* (2006.01)

(52) U.S. Cl.
CPC ............ *G06F 9/452* (2018.02); *G06F 3/0482* (2013.01); *G06F 3/0486* (2013.01); *G06F 11/3065* (2013.01); *G09G 5/30* (2013.01)

(58) Field of Classification Search
CPC ...... G06F 3/0482; G06F 3/0486; G06F 9/452; G06F 11/3065; G09G 5/30
See application file for complete search history.

(56) References Cited

U.S. PATENT DOCUMENTS

| | | | | |
|---|---|---|---|---|
| 7,275,213 | B2 | 9/2007 | Katano | |
| 7,917,861 | B2 | 3/2011 | Boettcher et al. | |
| 10,740,120 | B2 | 8/2020 | Coleman et al. | |
| 11,520,608 | B1 | 12/2022 | Cohen et al. | |
| 2009/0235149 | A1* | 9/2009 | Frohwein | G06F 9/451 715/205 |
| 2011/0178977 | A1* | 7/2011 | Drees | G06Q 10/04 706/52 |
| 2013/0263032 | A1* | 10/2013 | Vainio | G06F 3/04842 715/765 |
| 2014/0181676 | A1* | 6/2014 | Samborskyy | H04L 41/22 715/736 |
| 2016/0117760 | A1* | 4/2016 | Yum | G06Q 30/08 705/26.8 |
| 2017/0154495 | A1* | 6/2017 | Sri | G06Q 30/0241 |

(Continued)

FOREIGN PATENT DOCUMENTS

| | | |
|---|---|---|
| KR | 20160129968 | 11/2016 |

*Primary Examiner* — Seth A Silverman
(74) *Attorney, Agent, or Firm* — Barnes & Thornburg LLP

(57) ABSTRACT

A system and method for customizing a graphic user interface with a plurality of widgets each associated with metric data corresponding to operational parameters of cryptocurrency miners, cloning the customized graphic user interface including operative configuration settings of selected cryptocurrency miners, transferring the customized graphic user interface to either an external device, or to one or more cryptocurrency miner, and rendering the cloned graphic user interface on display of user device for displaying the metric data of the selected cryptocurrency miners in real-time.

46 Claims, 19 Drawing Sheets

(56) References Cited

U.S. PATENT DOCUMENTS

| | | | | |
|---|---|---|---|---|
| 2018/0274347 | A1* | 9/2018 | Ricotta | E21B 43/34 |
| 2018/0361045 | A1 | 12/2018 | Griessmann | |
| 2020/0044682 | A1* | 2/2020 | Sharma | H04B 1/401 |
| 2020/0218321 | A1* | 7/2020 | Chang | G06F 1/188 |

* cited by examiner

SYSTEM AND METHOD OF CUSTOMIZING AND CLONING A GRAPHIC USER INTERFACE FOR MONITORING AND MANAGING METRIC DATA OF CRYPTOCURRENCY MINERS IN REAL-TIME

CROSS-REFERENCE

This application claims priority to U.S. Provisional Patent Application Ser. No. 63/446,583, filed Feb. 17, 2023, which is incorporated by reference herein in its entirety.

FIELD OF THE INVENTION

The present disclosure relates to graphic user interfaces, and more particularly, to a system and method for customizing a graphic user interface with a plurality of user-preferred widgets that correspond to metric data of cryptocurrency miners, cloning the customized graphic user interface, transferring the customized graphic user interface to cryptocurrency miners, and rendering the cloned graphic user interface on a remote, user device for displaying the metric data of cryptocurrency miners in real-time.

BACKGROUND OF THE INVENTION

It is important for operators, whether situated remotely, or while present on-site, to monitor metric data associated with operational parameters of cryptocurrency miners when mining digital currency to effectively and efficiently manage mining costs, and improve mining profits. For example, operators often monitor temperatures, and fan speeds to make sure miners are not overheating, and are working in safe temperature ranges, examine hashrate and/or power consumption values of cryptocurrency miners, and review pooling information to better ascertain profit allocation. To garner larger profits, and improve the competitive edge of obtaining more digital currency rewards, mining often involves hundreds or thousands of cryptocurrency miners that are generally concentrated on mining farms, and operate simultaneously to solve complex mathematical computations defined by the type of digital currency mined.

Graphic user interfaces are generally employed by users to communicate with cryptocurrency miners. However conventional graphic user interfaces made available basically provide certain drawbacks, and typically offer limited use. For example, traditional graphic user interfaces generally include a fixed, static layout of graphical elements that not only configured as a one size fits all approach made applicable to all cryptocurrency miners, but often provide little assistance to operators or users cause they are not able to customize the graphic interface to provide for a dynamic, screen layout of graphical elements deemed of greater interest in accordance with functional attributes of cryptocurrency miners, nor customize a variety of different graphic user interfaces that can be used with different groups of cryptocurrency miners. Further, traditional graphic user interfaces do not provide the ability to clone customized user interfaces, and transfer the cloned, customized interfaces to a select group of cryptocurrency miners to monitor metric data of miners in real-time.

Accordingly, there remains a need for a system and method of controlling and managing cryptocurrency miners by allowing users to customize a graphic user interface with user-preferred widgets that each correspond to various metric data or operational parameters of cryptocurrency miners, cloning the customized graphic user interface, transfer the customized graphic user interface to a ground of designated cryptocurrency miners, and render the cloned customized graphic user interface on a display of a remote user device to remotely monitor the metric data of miners in real-time.

SUMMARY OF THE INVENTION

The present disclosure is directed to a system and method for customizing, and cloning a graphic use interface (GUI) that comprises a dashboard screen, a widget screen, a system screen, a cloning screen, a cloning options screen, a cloning result screen, and a diagnostic screen, transferring a cloned GUI file to a predetermined group of cryptocurrency miners, and rendering the cloned GUI on a display of a remote device to monitor metric data of cryptocurrency miners in real-time.

There is provided in a first embodiment of the present invention a method of customizing a graphic user interface in communication with a cryptocurrency miner including a plurality of hash boards each having a plurality of mining chips, said method comprising the steps of: providing in said cryptocurrency miner a processor in communication with a computer-readable medium storing thereon computer-executable instructions, that when executed by the processor, causes the processor to generate a dashboard screen including a plurality of widgets, each of the plurality of widgets corresponding to metric data associated with operational parameters of the cryptocurrency miner, establishing communication between the cryptocurrency miner and a user device over a communication network, and rendering the dashboard screen including a layout of the plurality of widgets on a display associated with the user device, the metric data being displayed in real time.

The metric data comprises any of hash rate values, voltage values of each of the plurality of mining chips, frequency values of each of the plurality of mining chips, mine pooling data, temperature values of each of the plurality of hashboards, temperature values of each of the plurality of mining chips, mining efficiency values, power consumption values, error percentages, operating costs, coin price, cooling fan speeds, fan duty, and percentage fees.

The processor executes the computer-executable instructions to further generate a widget menu including a list of widgets comprising an average hash rate widget, a power widget, a temperature widget, a hashboard widget, a temperature chart widget, a hash rate chart widget, an error widget, a pools widget, a fans widget, an efficiency widget, a devfee widget, a bestshare widget, and a foundblocks widget.

The cryptocurrency miner receives communication from the user device to retrieve a plurality of widgets that are selected by an authenticated user from the widget menu, generates a customized dashboard screen with a layout of the retrieved plurality of widgets, and renders the customized dashboard screen including the layout of the retrieved plurality of widgets on a display associated with the user device based, the metric data associated with the retrieved plurality of widgets being displayed in real time.

The cryptocurrency miner receives optional communication from the user device to instruct the processor to perform a drag and drop process where the user selects any of the plurality of widgets provided in the customized dashboard screen, drags any of the selected widgets within a layout configuration of the dashboard screen, and drops the selected plurality of widgets in position within the layout configuration of the dashboard screen.

In one aspect, the customized dashboard screen is simultaneously saved as a customized dashboard file on the computer-readable medium, or the customized dashboard file is exported onto an external device, onto external memory, or onto a cloud-based management system.

The cryptocurrency miner further receives communication from the user device to instruct the processor to initiate a cloning process to clone the customized dashboard screen, where the cloning process provides a cloning menu including a list of cloning options comprising an action function, a pool setting function, a security function, and a user interface function.

The cloning process also includes the steps of receiving from the user device input depicting a range of internet protocol addresses each associated with a cryptocurrency miner defining a group of miners, selectively configuring pool mining information, an operation state, a time zone, an interface language, and an appearance theme, and providing a dashboard layout setting for users to clone sizes and layout positions of the plurality of widgets provided in the customized dashboard screen.

The cloning process includes the step of generating a cloned customized dashboard file comprising the customized dashboard screen, and transferring said cloned customized dashboard file to a computer-readable memory on each of the cryptocurrency miners provided in the group of cryptocurrency miners, or exporting the cloned customized dashboard file to an external device that subsequently renders the cloned customized dashboard file to each cryptocurrency miner provided in the group of cryptocurrency miners as defined in the range of internet protocol addresses.

The cloning process further includes the step of generating a cloning result screen, the cloning result screen accessible by the user device to view confirmation that each of the cryptocurrency miners listed in the group of miners received the transferred cloned customized dashboard file.

The computer-executable instructions are further executed by the processor to cause the processor to generate a graphic user interface comprising a system screen accessible by the user device and navigated by a user to preset new passwords, configure network settings, back-up configuration settings of miners, restore configuration settings of miners, reset miner firmware, set time zones, set desired language, and configure appearance attributes of the dashboard screen.

The computer-executable instructions are further executed by said processor to cause the processor to generate a graphic user interface comprising a diagnostic report screen to document subject matter related to the operational status of the cryptocurrency miner, the processor generating the documented diagnostic report, and selectively exporting the generated diagnostic report to an external device upon initiation of a user.

The dashboard screen includes a data log operator initiated by users to display metric data in real time, where the metric data is displayed in an expanded log window such that metric data that is generated with a most recent time of day is displayed at a bottom end of the expanded log window and sequentially scrolls upwards within the expanded log window as subsequent metric data is generated in accordance with a most recent time of day.

The method further comprises the step of determining display attributes of the user device where the display attributes comprise first display attributes associated with a laptop or desktop computer, second display attributes associated with an electronic tablet, and third display attributes associated with a mobile phone, the display attributes also selectable from the widget menu by users via, the user device, the display attributes comprising any of size or dimension of display of the user device, pixel density of display, scaling, resolution of display, or a meta viewpoint value provided in a control program employed by the user device.

The step of rendering includes rendering the dashboard screen including a layout of the plurality of widgets on the display associated with the user device based on the determined display attributes.

There is provided in a second embodiment of the disclosure materials a non-transitory computer-readable medium storing thereon computer-executable instructions that, when executed by a processor in communication with a cryptocurrency miner including a plurality of hash boards each having a plurality of mining chips, causes the processor to generate a dashboard screen including a plurality of widgets, each of said plurality of widgets corresponding to dynamic data associated with operational parameters of said cryptocurrency miner, establish communication between said cryptocurrency miner and a user device over a communication network, and render said dashboard screen including a layout of said plurality of widgets on a display associated with said user device, said dynamic data displayed in real time.

There is also provided in a third embodiment of the present invention a method of monitoring and managing a cryptocurrency miner including a processor in communication with memory, and a plurality of hashboards each having mining chips thereon, said method comprising the steps of: storing computer-executable instructions in said memory, that when executed by said processor, causes the processor to generate a graphic user interface comprising a dashboard interface, outputting from the processor a layout of a plurality of widgets provided in the dashboard interface, each of the plurality of widgets comprising metric data, in real time, of one or more operational parameters of the cryptocurrency miner, establishing communication between the cryptocurrency miner and a user device including a display over a communication network, and rendering the dashboard interface including the layout of the plurality of widgets on the display based on predetermined display attributes of the user device.

There is further provided in a fourth embodiment of the present disclosure a system for customizing and cloning a graphic user interface to monitor metric data of a mining machine, where the system comprises: a mining machine configured to communicate with a remote device over a communication network, the mining machine including at least one processor in communication with memory, the processor executing instructions stored in the memory to: generate a graphic user interface comprising a dashboard interface including a layout of a plurality of widgets that are each associated with metric data of the mining machine, establish communication between the mining machine and the remote device including a display, render the dashboard interface on the display of the remote device, customize the dashboard interface by selecting a plurality widgets from a widget menu generated by the processor, where the processor reconfigures the dashboard interface to generate a customized dashboard interface with a layout of the selected plurality of widgets, save the customized dashboard interface, initiate a cloning process to clone the customized dashboard interface to create a cloned dashboard file, transfer the cloned dashboard file to a predetermined group of mining machines, or to an external device, and render data representative of the cloned dashboard file including the layout of the plurality of widgets on the display of the remote device when communicating with the mining machine.

These and other objects, features, and advantages of the present invention will become more readily apparent from the attached usageings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

Figure 1:
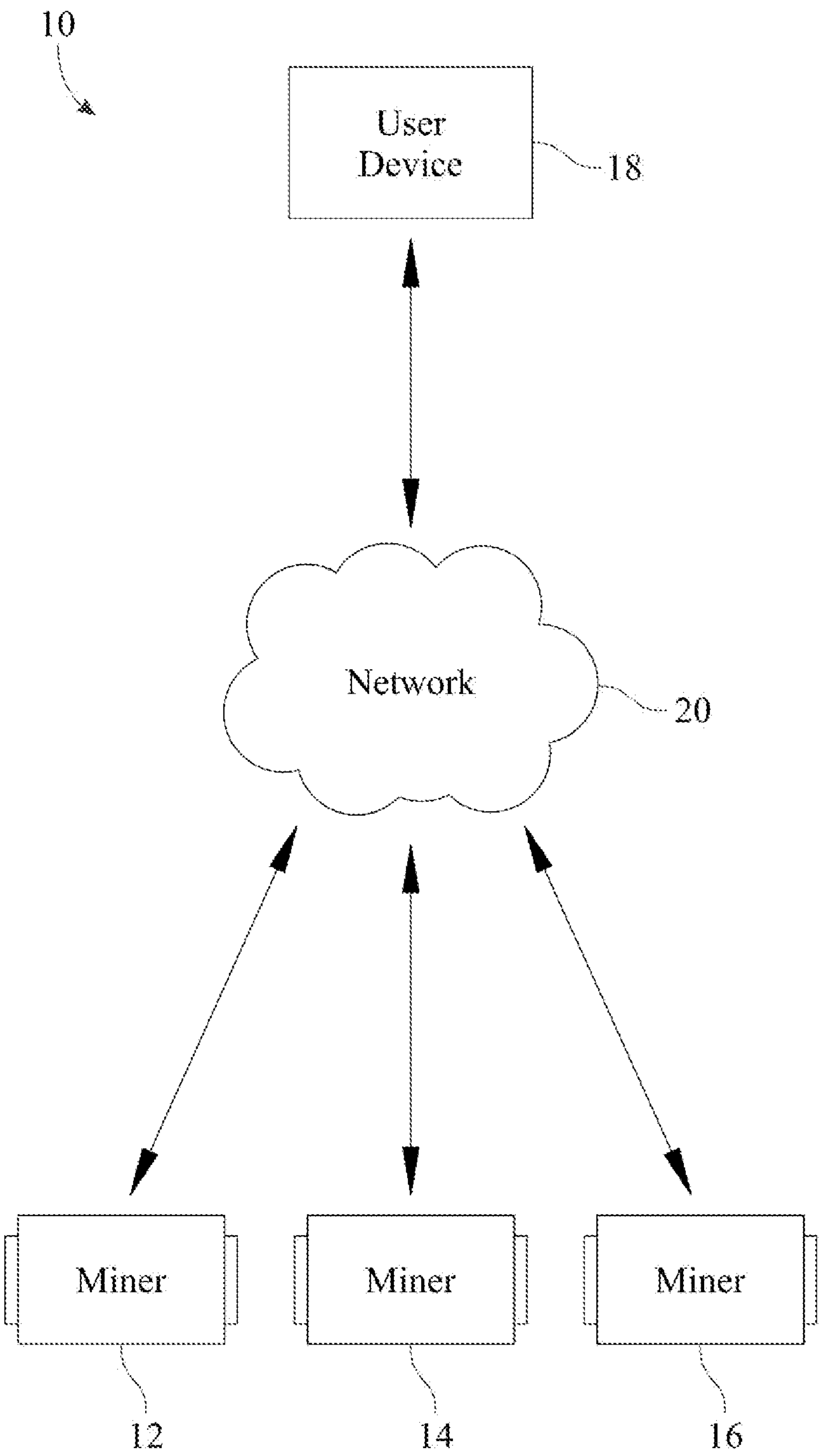
FIG. 1 is a system and method for remotely communicating with one or more miners over a communication network, via, a user device, in accordance with one exemplary embodiment of the present invention.

The following detailed description is merely exemplary in nature and is not intended to limit the described embodiments or the application and uses of the described embodiments. As used herein, the word “exemplary” or “illustrative” means “serving as an example, instance, or illustration”. Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not limiting, unless the claims expressly state otherwise.

Terms such as “a,” “an,” and “the” include plural references unless the context clearly dictates otherwise. Terms such as “have,” “may have,” “include,” and “may include” indicate the presence of corresponding elements, such as numerical values, functions, operations, or parts, but do not preclude the presence of additional features.

Terms such as “first” and “second” may modify various components, members, or elements regardless of an order and/or importance of the components, members, or elements, and do not limit the components, members, or elements. These terms may be used for the purpose of distinguishing one component, member, or element from another component, member, or element.

For example, a first cryptocurrency miner, a second cryptocurrency miner, and a third cryptocurrency miner may indicate different cryptocurrency miners, regardless of the order or importance. When a first component, member or element, is "coupled with/to" or "connected to" a second component, member or element, the first component, member or element may be directly coupled with/to the second component, member or element, or there may be an intervening component, member or element, such as a third component, member or element, between the first and second components, members or elements. However, the term "directly coupled with/to" or "directly connected to" denotes there is no intervening third component, member or element.

The term, "cryptocurrency", or "digital currency", as used herein refers to digital or virtual currency such as digital coins, including but not limited to, Bitcoin, Altcoin, Lite coin, Doge coin, Ethereum, Ripple, Omni, Stellar, NEO, and Cardano.

The term, "widget", as used herein is an element of a graphic user interface that displays data, information, binary values, percentages, amounts, graphs, charts, pictorials, tables, numerical values, measurement values, estimated values, and/or calculated values associated with, or corresponding to, various metric data, or operational parameters of cryptocurrency miners associated with the operation of electronic components of each cryptocurrency miner including for example, fans, mining chips, hashboards, temperature sensors, speed sensors, processor(s), memory, power supply unit, power consumption, or use, power draw, data network, data network circuitry, I/O interface, internet data, or other components, and associated with other metrics including profits, pooling information or data, miner IP addresses, authentication protocols, operating efficiency, profit scales or margins, or information associated with bitcoin mining including for example, difficulty, price of electricity, and operational costs.

Exemplary embodiments of the present invention can include one or more interfaces for communicating with, or managing cryptocurrency miners. The term, "interface", or "interfaces", refers to, or means one or more devices, systems, or programs, that enable a user to communicate and exchange information with one or more computers, and/or servers, and enables users to view, edit or amend, add, create, manipulate, save or store, input, print, submit, transfer, manage, navigate, and import/export, any and all data, information, bits, values, elements, figures, symbols, characters, terms, numbers, graphs, or the like, relating to software program applications, web applications, or web pages. The term "interface", or "interfaces", may include software interfaces, hardware interfaces, or a combination of both software and hardware interfaces. The system and method of the present invention is implemented to provide distinct user-specific interfaces where a user may comprise, but is not limited to, an operator, a vendor, an owner, a distributor, an engineer, a programmer, an investor, or any authorized person. The term "user" may also comprise an artificial intelligence network or system.

Unless specifically stated otherwise, as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Referring now to the figures wherein like elements are represented by like numerals throughout, there is shown in FIG. 1, a system and method for customizing a graphic user interface (GUI) including a plurality of widgets associated with metric data of cryptocurrency miners 12, 14, 16 (hereafter referred to as miners), cloning the customized GUI, transferring the customized GUI to designated miners, and rendering the cloned GUI on display of a user device 18, via, communication network 20. User device 18 may include any of a cellular or smart phone, a tablet, a laptop or a desktop computer (PCs), a mobile phone, an electronic book reader, a notebook computer, a workstation, a server, or a personal digital assistant (PDAs), which include, or are in electrical communication with, a monitor, or display for managing, viewing, or engaging with, the graphic user interfaces. Communication network 20 supports electronic communication between the user device 18 and cryptocurrency miners 12, 14, 16, between user device 18 and other peripheral devices including, but not limited to, one or more databases, servers, printers, web cams, sensors, monitors, detectors, video systems, cameras, lights, Internet of Things (IoT), data recorders, or the cloud, and communication between the miners 12, 14, 16 themselves. Communication network 20 may comprise a wired or wireless communication network including a WLAN (wireless local area network, such as Wi-Fi (IEEE 802.11)), WPANS (wireless personal area networks, such as (IEEE 802.15), InfraCCGI, Zigbee), WMAN (wireless metropolitan area network, such as WiMax (IEEE 802.21)), WWAN (wireless wide area networks, internet), and GAN (global area network), a telephone network, (e.g., analog, digital, wired, wireless, PSTN, ISDN, or XDSL, a cellular communication protocol, including LTE, LTE-advanced (LTE-A), code division multiple access (CDMA), wideband code division multiple access (WCDMA), universal mobile telecommunication system (UMTS), wireless broadband (WiBro), GSM, 3G, 4G, 5G, an internet-protocol based communication system, or other radio network (RF), cable network, satellite network, optical network, the internet, via Ethernet, or intranet system, LAN (Local Area Network), PAN (Personal Area Network), MAN (Metropolitan Area Network), and WAN (Wide Area Network). Communication network 20 may include a variety of communication or information exchange components, elements, or peripherals, including, but not limited to, one or more base stations, proxy servers, routers, switches, gateway, repeaters, Ethernet hubs, wired or wireless data pathways, or modems, that are configured to direct and/or deliver data and/or information.

Figure 2:
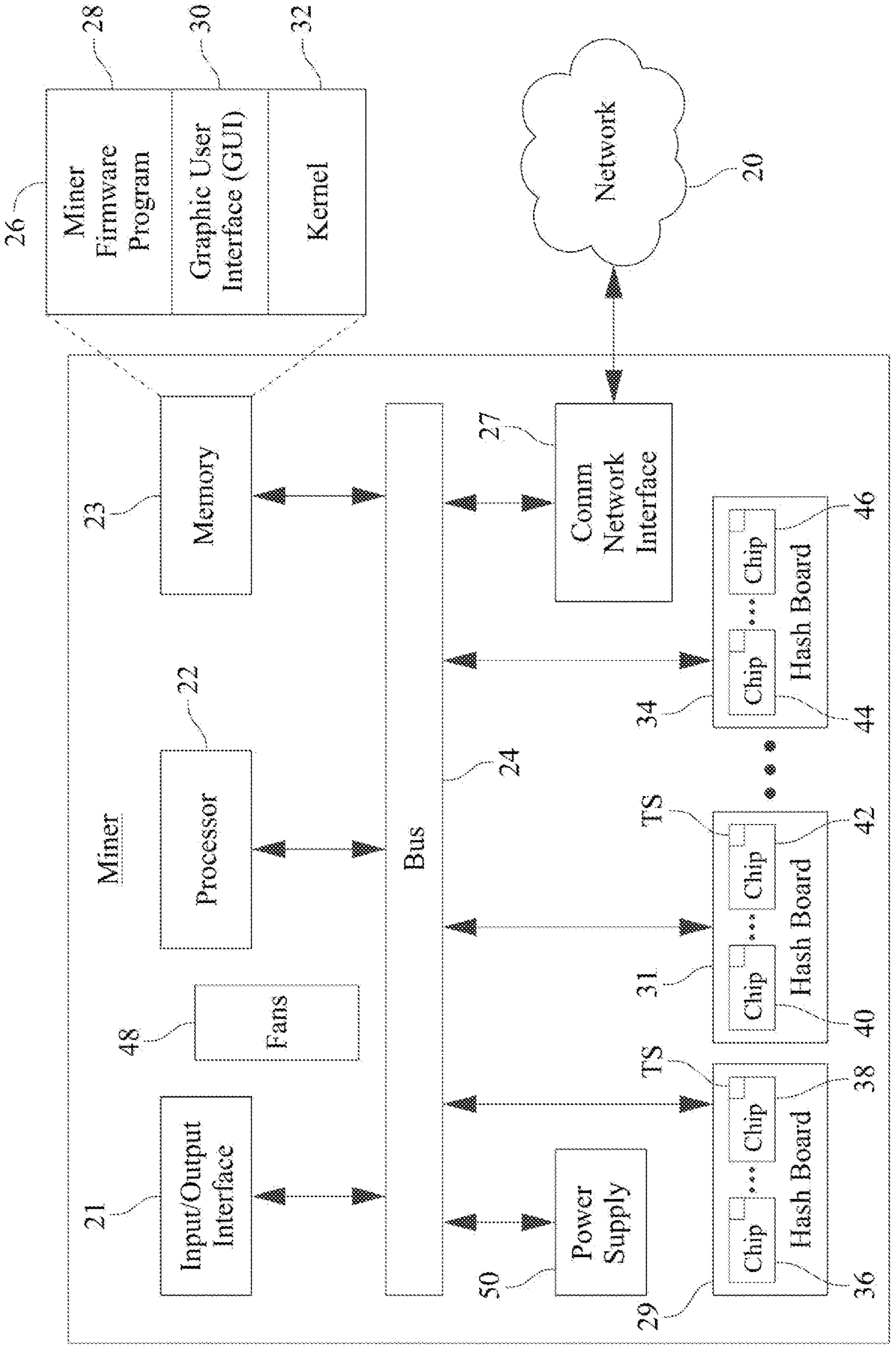
FIG. 2 is a schematic representation of a cryptocurrency miner illustrating functional elements including a power supply, an input-output interface, a processor, a memory hosting a software application platform including miner firmware, and GUI interface, a communication network interface, and a plurality of hash boards each including a plurality of mining chips, and each electrically coupled to a communication bus.

Turning to FIG. 2, there is shown a schematic representation of a miner 12, 14, 16 illustrating various functional elements. Though a single miner is selected for illustration purposes, additional miners include the same or similar functional components or elements. Each miner 12, 14, 16 includes an input-output interface (I/O) 21, one or more processors 22 for processing machine-executable program instructions, or computer application programs (e.g. software) associated with firmware and/or driver program(s), and graphic user interface software that is electrically coupled to memory 23 for storing machine-executable program instructions, code, instructions, firmware, the graphic user interface software, computer application programs, or other software applications. The one or more processors 22 may include various processing circuitry, such as a central processing unit (CPU), an application processor (AP), and/or a communication processor (CP), microcontrollers, microprocessors, embedded processors, and/or a system on a chip (SOC). Memory 23 communicates with processor(s) 22 and other components via, communication bus 24. Memory 23 may comprise read only memory (ROM), random access memory (RAM), static random access memory (SRAM), synchronous dynamic RAM (SDRAM), NAND memory, nonvolatile/flash-type memory, machine-readable media, EEPROM, EPROM, an external hard disk drive, a server, flash memory, solid state drivers, memory dongle, internal hard disk drive, or secure digital (SD) card. The I/O interface 21, one or more processors 22, and memory 23 may comprise a single unit provided via, on a single printed circuit board (PCB), or may comprise, separate and distinct components or printed circuit boards that are operatively coupled together.

Each miner 12, 14, 16 includes a software/application platform denoted at 26 comprising miner firmware and/or driver software 28, a graphic user interface GUI 30, a kernel 32, and optional application program interfaces (API) not shown. The kernel 32 controls or manages system resources, such as the bus 24, processor 22, and/or memory 23 for performing operations or functions implemented by programs, such as an API, and/or the GUI 30, and may provide an interface through which applications 28, 30 connect to individual elements to control, or manage system resources. Each miner 12, 14, 16 includes a communication network interface 27 for electrically communicating with user device 21 via, communication network 20. Communication network interface 27 may include an Ethernet network interface circuitry, a wireless network interface circuitry, routers, modems, and/or bluetooth technology. Cooling fans 48 may be provided to help cool excess heat generated by electrical components including mining chips. Each miner 12, 14, 16 further includes a plurality of hash boards 29, 31, 34 each including a plurality of mining chips 36, 38, 40, 42, 44, 46 for mining digital currency, such as bitcoin. Each mining chip 36, 38, 40, 42, 44, 46 comprises an application-specific integrated circuit (ASIC) chip that is embedded with a designated algorithm for mining a specific digital currency attributed to bitcoins, but may alternatively comprise field programmable gate array chips (FPGA), or Graphic Processing Unit chips (GPU), or any combination thereof.

Each miner 12, 14, 16 includes a variety of sensors or detectors for monitoring various metric data or operational parameters during operation. Sensors may include for example, temperature sensors for monitoring temperature of mining chips, or hash boards, encoder sensors to measure the speed of fans, and voltage and/or current sensors. For example, various temperatures are continuously monitored to effectively control the operation of miners 12, 14, 16. In practice, on-chip temperature sensors denoted as TS are provided on, or adjacent to, each respective mining chip to consistently measure the chip temperatures in real-time.

Miner firmware comprising a dynamic tuning firmware and/or driver application program (DTFP) 28 comprising software, instructions, computer code, application(s) and/or program(s) is implemented to efficiently and effectively communicate with, control, and manage the operation of each miner 12, 14, 16 including the operation of each hash board 29, 31, 34, and mining chips 36, 38, 40, 42, 44, 46 when mining digital currency. DTFP 28 may refer to an application program that is hosted in memory or written in EPROM (Erasable Programmable Read-Only Memory) or EEPROM (Electrically Erasable Programmable Read-Only Memory). DTFP 28 may also include one or more drivers (driver software) where drivers are part of the firmware application, or comprise separate driver programs or applications. The DTFP 28 may also include power supply firmware that is stored or hosted in memory 23, or in the power supply unit 50. In one embodiment, the DTFP 28 is stored in a machine-readable executable medium hosted on each miner 12, 14, 16. Alternatively, the DTFP 28 is hosted on the user device 18, on an external server, database, or on a cloud-based management system accessible via communication network 20. DTFP 28 provides necessary program operator-interfaces (e.g. interface screens) needed for operators to communicate, interact, manage, control, and exchange information with miners 12, 14, 16. The DTFP 28 allows operators to preconfigure various operational parameters through designated operator interfaces, including the ability to select or preconfigure chip profile configurations, operator-defined profile configurations, target chip temperatures, profit analysis and variables, and for selectively disabling, or enabling certain modes of operation affiliated with each miner 12, 14, 16. Chip profile configurations may include, inter alia, a voltage profile range including a maximum and minimum chip voltage, and a frequency profile range including a maximum and minimum chip frequency. The DTFP 28 may provide auto-tuning control for dynamically adjusting voltages, and frequencies associated with the voltage and frequency profile ranges, respectively, to determine tuned parameters including a target chip voltage, and target chip frequency to provide efficient power usage, and optimal hash rate when applied to miner chips. During an auto-tuning process, voltage and frequency values provided in each voltage and frequency profile range associated with each selected chip profile configuration, are dynamically adjusted until a target chip voltage, and target chip frequency that provides the lowest power consumption at the highest chip hash rate is found. Auto-tuning adjusts the chip voltage, and chip frequency, of each profile range, to determine a target chip voltage, and target chip frequency for each miner chip to provide low power usage, and optimal hash rates to optimally manage chip temperature and operating costs, and to garner the highest profits. The DTFP 28 may collect, monitor, process, manage, analyze, and store metric data associated with various performance factors including: data or information used during auto-tuning. Further, the firmware includes a profit analysis process including profit variable management when mining digital currency, and provide a profit algorithm that employs profit variables to apply tuned parameters that generate the highest profits. The firmware may include auto-switch control to selectively switch between chip profile configurations based on various condition parameters. Operators can preset operator-defined profile configurations to manually preset operator-defined chip profile configurations. Additional tuning processes may include configuration and functionality of peripheral interface controllers PIC that may be provided on each hash board 29, 31, and 34.

Miners 12, 14, 16 may include one or more card slots for accommodating a memory card to add functionality such as additional memory, I/O functionality, or networking capability. The card may be a flash memory card, such as a SecureDigital (SD) card, mini or micro SD, CompactFlash card, Multimedia card (MMC), etc. Additionally, in some embodiments a card slot may receive a Subscriber Identity Module (SIM) card, for use with an embodiment of the electronic device 10 that provides mobile phone capability.

It is important for operators, whether remotely, or while present on-site, to monitor dynamic data or metric data that is associated with, or that corresponds to, various operational parameters of cryptocurrency miners 12, 14, 16 to effectively and efficiently manage the operation of the miners in order to garner optimal profits. Such metric data of operational parameters of miners may include, but is not limited to, temperature of hash boards, temperature of mining chips, power usage or draw, operation and speed of cooling fans, hash rates of mining chips, frequency and/or voltage values of mining chips, mining profits, coin prices, mining efficiency, error percentages, costs, fan duty, percentage fees, fees, humidity values, hashboard data, pooling information, temperature of cooling liquid, and other working parameters. For example, to avoid possible damage and down time, operators may need to monitor temperatures of chips and/or hash boards, and the speed of fans speed to make sure miners 12, 14, 16 are operating in safe temperature ranges, they also monitor hash rates, and power consumption when considering cost of electricity, and price of digital money, to optimize profits, and they review pooling information to determine what group of miners are actively mining, or what amount of shares are being submitted to the mining pool.

There is provided on each cryptocurrency miner a graphic user interface GUI platform 30 that provides an effective tool to operators for quickly and visually monitoring, and analyzing certain metric data corresponding to the operational parameters of miners using a user device 18. The GUI 30 is stored in a computer-readable medium 23, or in memory provided along with one or more processors in each miner 12, 14, and 16. Users can access the software/application platform 26 and GUI platform 30, via, a user device 18 to customize the GUI with a plurality of user-preferred widgets that are deemed more important when monitoring the performance of miners. The user device 18 may comprise a local or remote device. As such, a user can access the GUI 30 for a selected miner, and customize the GUI in accordance with user-preferred widgets in accordance with various working conditions, geographic location, and/or type of miner 12, 14, 16 employed. To help reduce down time, and promote efficient operation, operators or users can also clone a customized GUI 30 by generating a cloned GUI data file, and subsequently transfer the cloned GUI data file to predetermined, designated miners, or groups of miners 12, 14, 16 without having to customize a graphic user interface for each individual miner 12, 14, 16. In one embodiment, users can customize a first GUI 30 with a plurality of widgets for a first group of miners 12, 14, 16, clone the first customized GUI interface to create a first customized GUI data file, save the first customized GUI data file, and transfer the first cloned GUI data file to a first selected group of miners, users can subsequently customize a second GUI 30 with a plurality of user-preferred widgets for a second group of miners 12, 14, 16, clone the second customized GUI interface to create a second customized GUI data file, save the second customized GUI data file, and transfer the second cloned GUI data file to a second selected group of miners different then the first group of miners. A customized GUI 30 may comprises a customized single screen, or multiple, customized screens.

Figure 4:
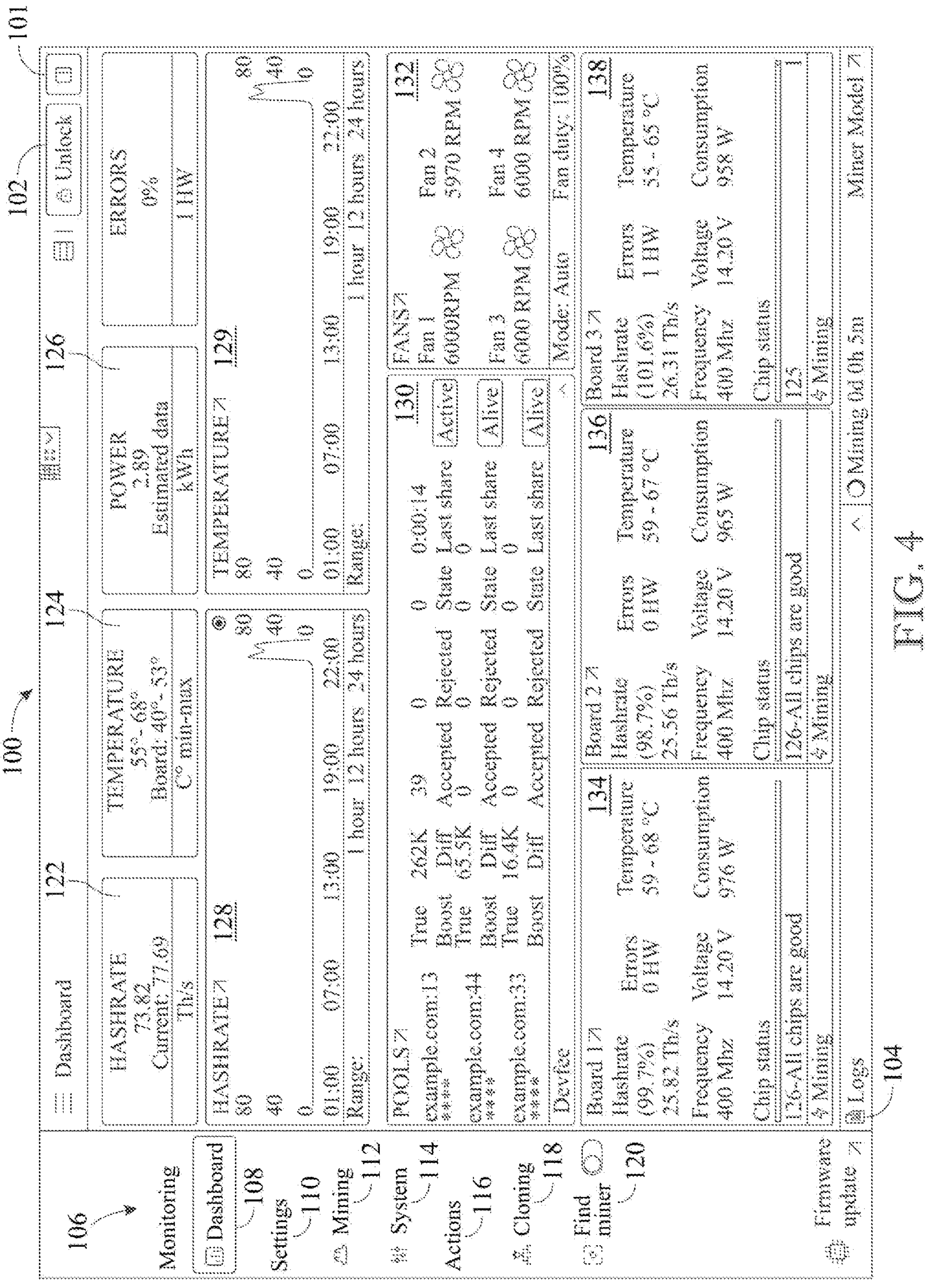
FIG. 4 is a graphic user interface illustrating a dashboard screen, previously customized by a user, and shown in a locked, read-only mode, including a plurality of widgets associated with metric data corresponding to operational parameters of a cryptocurrency miner.
Figure 7:
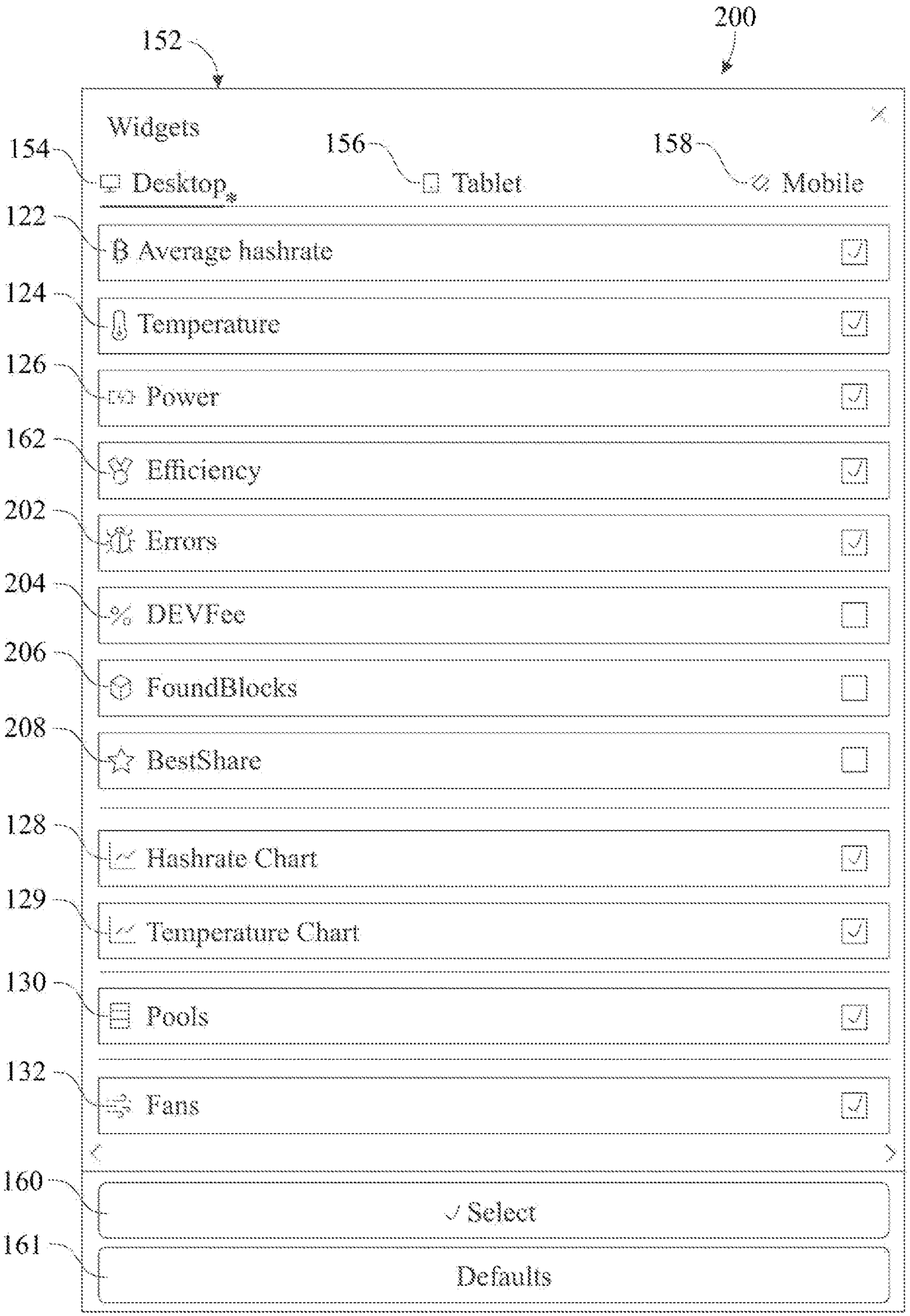
FIG. 7 is a graphic user interface illustrating the widget screen, showing the widget menu including a plurality of widgets each associated with metric data corresponding to operational parameters of a cryptocurrency miner, and selected by users to customize the layout of the dashboard screen for designated cryptocurrency miners.

In one embodiment, GUI 30 comprises various interface screens including a dashboard screen 100 as shown in FIG. 4, a widget screen 200 as shown in FIG. 7, a system screen 300, a cloning screen 400, a cloning options screen 500, a cloning result screen 600, and a diagnostic screen 600 where operators navigate between screens, via user device 18.

Figure 3:
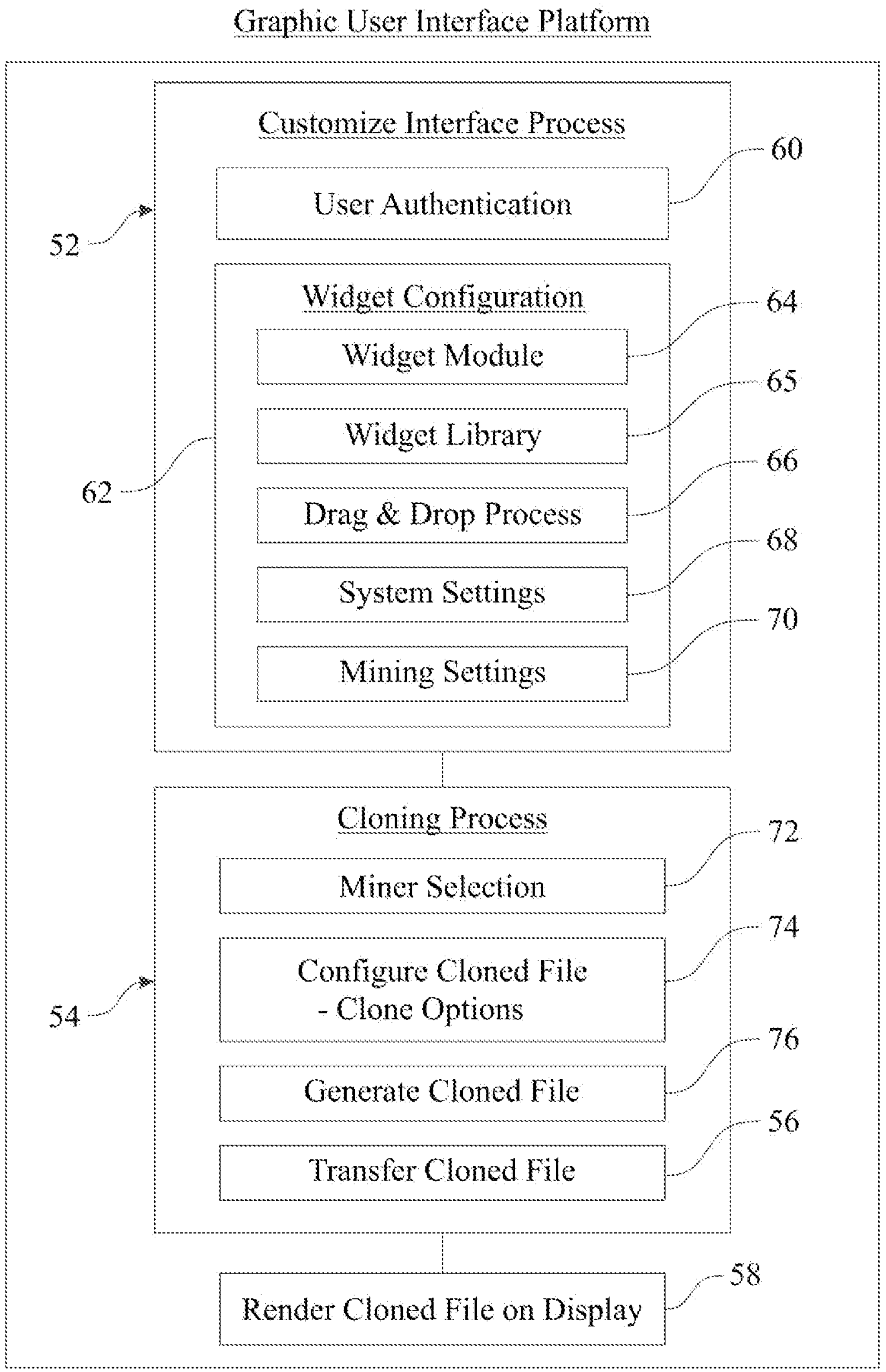
FIG. 3 is a block diagram of a graphic user interface platform including processes and functionalities associated with producing and customizing various interfaces including a dashboard screen, a widget screen, a system screen, a cloning screen, a cloning options screen, a cloning result screen, and a diagnostic interface screen, in accordance with one embodiment of the present invention.

Turning to FIG. 3 there is shown a block diagram of the graphic user interface (GUI) 30 comprising computer-implemented processes including a customize interface process 52, a cloning process 54, and a render display process 58. In one embodiment, a computer-readable medium, or memory 23 stores machine executable instructions for execution by the one or more processors 22 to perform the disclosed processes 52, 54, 58, functionalities, and operations described herein including authenticating operators, generating interfaces, customizing a GUI 30 comprising the dashboard screen, cloning the customized dashboard screen to create a cloned GUI file or a cloned dashboard file, transferring the cloned dashboard file to a group of predetermined miners 12, 14, 16, and rendering the cloned GUI file, or dashboard file on a display associated with, or provided on, the user device 18. It is appreciated that processes 52, 54, 58 may be implemented and performed on one or more external servers, or over a cloud management system that provides computing architecture including memory, a central processor unit including one or more processors communicating with memory, one or more databases, various modules, and other components that provide various operations accessible by operators via, user device 18. In practice, accessing a GUI 30 hosted on each cryptocurrency miner 12, 14, 16 generally begins with operators entering an IP address associated with a miner 12, 14, 16 in an address bar of a control program (e.g. browser) provided on, or accessible by, a user device 18. User device 18 may comprise a local device, or a remote device such as a smart phone, a notebook computer, a desktop computer or a tablet. The browser employed by the user device 18 includes the necessary user agent, or meta view-point values to determine the proper layout of GUI 30 to be displayed on a display associated with, or provided with or on, user device 18. The GUI 30 is displayed on the display of the user device 18 based on certain display attributes. For example, the GUI 30 is able to determine what type of user device 18 is electrically communicating with the miner 12, 14, 16 to generate and render the correct GUI layout on the detected display of the user device 18. Example of such display attributes may include, but is not limited to, the size or dimensions of the display, pixel density capacity of the display, scaling values, resolution values, meta view-point values, user agents, or other data. A step of determining display attributes of the user device 19 may include determining first display attributes associated with a laptop or desktop computer, second display attributes associated with an electronic tablet, and third display attributes associated with a mobile phone. It is also noted that display attributes are also governed by users selecting a whether a desktop 154, tablet 156, or mobile phone 158 is being used from a widget menu screen 200. In practice, a user enters an IP address of a miner in a browser to gain direct access to the software platform 26, and GUI 30 that is hosted on the miner. In an alternative embodiment, operators may enter a uniform resource locator (URL) in the address bar of the browser or control program to gain access to a authentication log-in page for operators to enter operator-authentication credentials to gain access to any of the miners 12, 14, 16 as provided by a user authentication process 60 for authenticating user-access. Upon accessing the GUI 30 of a miner, a user is first presented with a graphic user interface comprising a dashboard screen 100, that is shown in a locked, read only mode in FIG. 4 for viewing metric data corresponding to various operational parameters associated with the operation of selected miners 12, 14, and 16

The one or more processors 22 electrically communicates with memory 23 to execute instructions associated with the graphic user interface platform including a customize interface process 52. It is appreciated that dashboard screen 100 is shown throughout in either a locked, read only mode, or in an unlocked, edit mode of operation. The dashboard screen 100 provides a host of operative functionalities including: an unlock tab 102 initiated by operators to gain authenticated access for customizing the dashboard screen 100; a data log tab 104 for accessing and viewing data logs of miners 12, 14, 16 provided in an expandable log window; a dashboard banner 106 including a dashboard tab 108 initiated for customizing the dashboard with a plurality of widgets; a settings label 110 defining a mining tab 112 for viewing overall status and performance of miners 12, 14, 16 along with performance of various sensors, and a system tab 114 for configuring general, security and network settings of selected miners 12, 14, 21; an actions label 116 defining a cloning tab 118 for cloning and generating a cloned, customized GUI file, and a find miner tab 120 selectively activated by operators for sending one or more electrical signals to miners 12, 14, 21 to power electrical lights provided on the miners for helping technicians locate the miners in the mining farm.

Dashboard screen 100 includes a host of graphical interface elements comprising a plurality of widgets each associated with, or corresponding to, metric data or dynamic data corresponding to operational parameters of miners 12, 14, 16, and/or corresponding to measurement values of various sensors or detectors associated with such miners. For example, in one non-limiting embodiment, a first widget 122 defines a hash rate value associated with hash rates of mining chips 36, 38, 40, 42, 44, 46 provided on hash boards 29, 31, 34, where the hash rates comprise average hash rate values; a second widget 124 defines a temperature value associated with average or individual real-time temperatures of one or more hash boards 29, 31, 34, or mining chips, a third widget 126 provides power consumption values of miners 12, 14, 16, a fourth widget 128 is hash rate graph depicting the average hash rate values over time, a fifth widget 129 is a temperature graph depicting average temperature values over time, a sixth widget 130 provides pooling information to monitor the amount of shares being submitted to the mining pool, a seventh widget 132 provides cooling fan speeds, and other widgets 134, 136, 138 provide information or data corresponding to hash boards. The widgets are preselected, and initially arranged on dashboard 100 via, widget module 64, The widget module 64 is in communication with a widget library 65 of the customize interface process 52 to retrieve, process, and generate widgets in accordance with various layout configurations. Each widget 122, 124, 126, 128, 129, 130, 132, 134, 136, 138, comprises one or more mini-apps, data files, code, instructions, mini-applets, plug-ins, or any combination thereof, all of which is pre-stored in the widget library 65 that is hosted in the computer-readable medium, or memory 23, or hosted on an external device accessible by each miner 12, 14, 16, and/or user device 18. For example, widget library 65 may be hosted on one or more external servers, databases, hard drives, computers, or on a cloud-based architecture or management system, and accessible by each miner and/or by user device 18. It is appreciated that each of the plurality of widgets is associated with dynamic data or metric data that is produced in real-time. The firmware 28 and/or widget module 64 continuously tracks measurements, calculations, and/or values of each operating parameter of the miners, and/or sensors in real-time, and in real-time continuously associates, or assigns such measurements, calculations, and/or values as metric data to each corresponding widget. For example, the firmware 28 and/or widget module 64 records real-time values of hash rate of each mining chip, and associates or assigns the measured hash rate value to widget 122 as an average hashrage value of mining chips 36, 38, 40, 42, 44, 46 where such hashrate values are changing constantly in real-time while miners 12, 14, 16 are mining digital currency. One functionality of widget module 64 is to collect, store, organize, generate, transfer, and/or tabulate data and/or information for each widget where such data and/or information is associated with dynamic data, or metric data corresponding to the operational parameters of miners 12, 14, 16, and/or corresponding to operational parameters of sensors and/or detectors. Each widget may come in a variety of different colors, shades, sizes, or dimensions. Another functionality of widget module 64 is to permit operators to change the colors, shades, or appearances of each widget. For example, color and/or appearance configuration files may be provided to support altering the colors and/or appearances of each individual widgets. Operators may also change the size and/or dimension of each widget by stretching or compressing via, length or width, to make widgets appear smaller or larger in size on dashboard screen 100.

To monitor metric data of designated miners 12, 14, 16, in real-time, remote operators first access the miners 12, 14, 16 over a communication network 20, via a local or remote user device 18 where operators are presented with a graphic user interface screen comprising a dashboard screen 100 shown in a locked, read only mode, as illustrated in FIG. 4. It is noted that at this stage, unauthorized operators are not permitted to edit or customize the dashboard screen 100 but are able to monitor metric data or operational parameters of designated, miners in real-time, in a read or view only mode.

Upon gaining authorized access, operators are permitted to customize dashboard screen 100 for selected miners 12, 14, 16, or change the operation state of selected miners during a customize interface process 52, where the customizing process begins with one or more processors 22 executing computer instructions hosted in the computer-readable medium, or memory 23, and providing an operator authentication process 60. Upon activating unlock icon 102 as shown in FIG. 4, the authentication process 60 is initiated by the one or more processor 22, where operators are prompted with a pop-up entry box to enter authentication credentials. The authentication process 60 supports authentication/access protocols including a single or multi-tiered authentication process protocol. In general, an operator may be authenticated based on various factors including for example, an operator name, password, passphrase, PIN, secret question, secret answer, or possession of a machine readable secret data such as encryption key, or via, biometric attributes such as fingerprint, palm, voice characteristics, or iris pattern. In one example, operators enter an operator name, and password to satisfy the authentication protocol. In one embodiment, the authentication protocol may generate a security code that is forwarded to an operator's smartphone, via, a SMS text, to confirm the identity of the operator.

Figure 5:
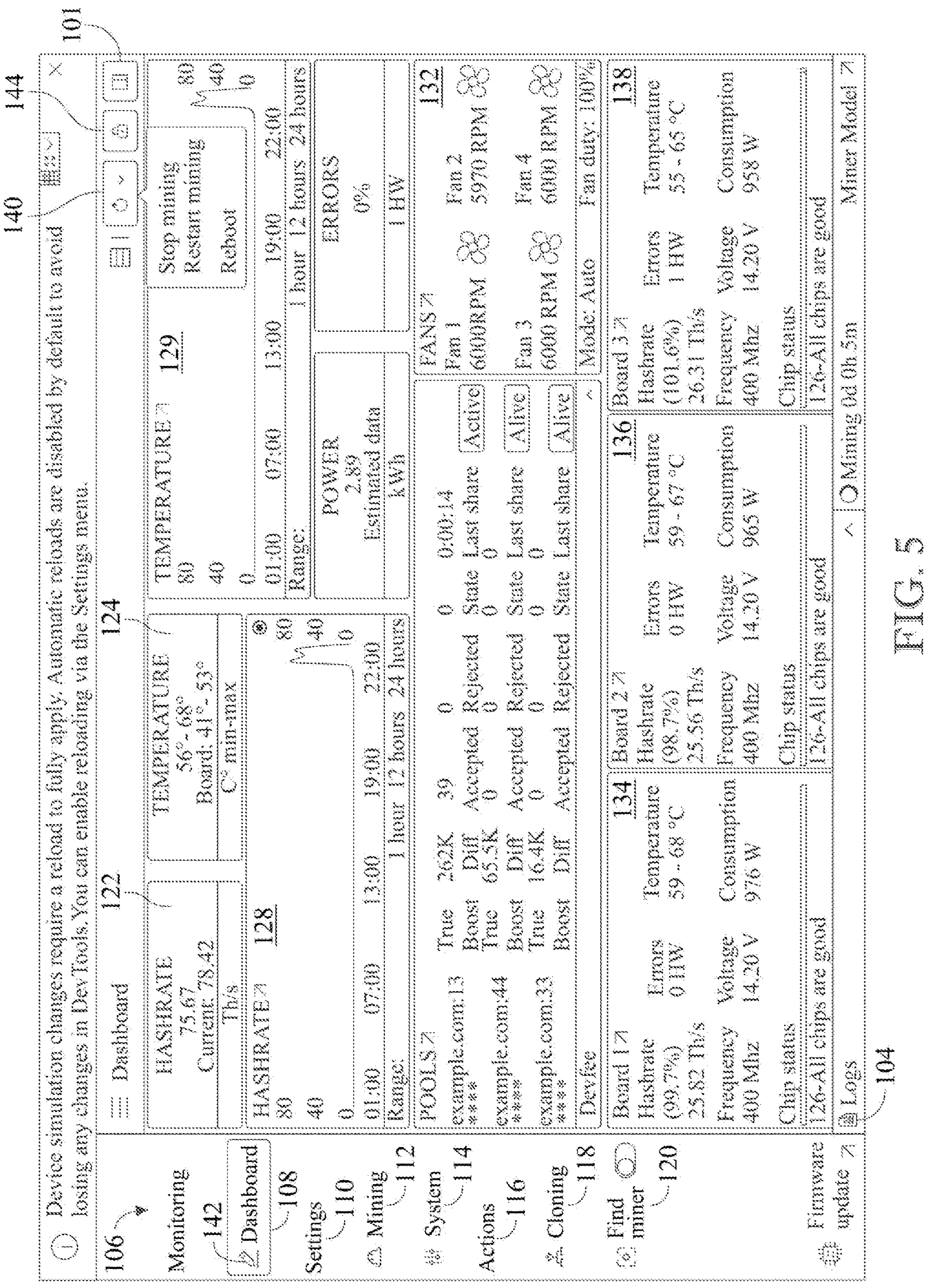
FIG. 5 is the graphic user interface illustrating the dashboard screen shown in an unlocked, edit mode, showing a menu for controlling an operative state of a cryptocurrency miner, and a banner including tabs for customizing the dashboard screen, settings of miners, system settings, and cloning configurations.

Authenticated operators are subsequently presented with dashboard screen 100 shown in an unlocked, edit mode in FIG. 5. Dashboard screen 100 provides a machine operation icon 140 for authorized operators to stop, restart, or reboot miner 12, 14, and 16. In the unlocked mode, the dashboard 108 provides a customize operator 142 to launch a customize mode for customizing the dashboard screen 100 layout with a plurality of widgets in accordance with user-preference, or various functional attributes associated with selected miners 12, 14, 16. A lock icon 144 is provided to allow operators to reposition dashboard screen 100 in a locked, read-only mode as previously shown in FIG. 4, preventing unauthorized operators from stopping, starting or rebooting the miner 12, 14, 16, and from customizing dashboard screen 100.

As shown in FIG. 4, dashboard screen 100 also provides a sidebar tab 101 for generating a banner that displays miner information about selected miners 12, 14 and 16. Such miner information may include, but is not limited to, an IP address, recent events the miner encountered, information relating to hardware, firmware/software hosted on the miner 12, 14, 16 12, 14, 16, network information, network security information, current version of firmware, or type or model of miner.

Figure 6:
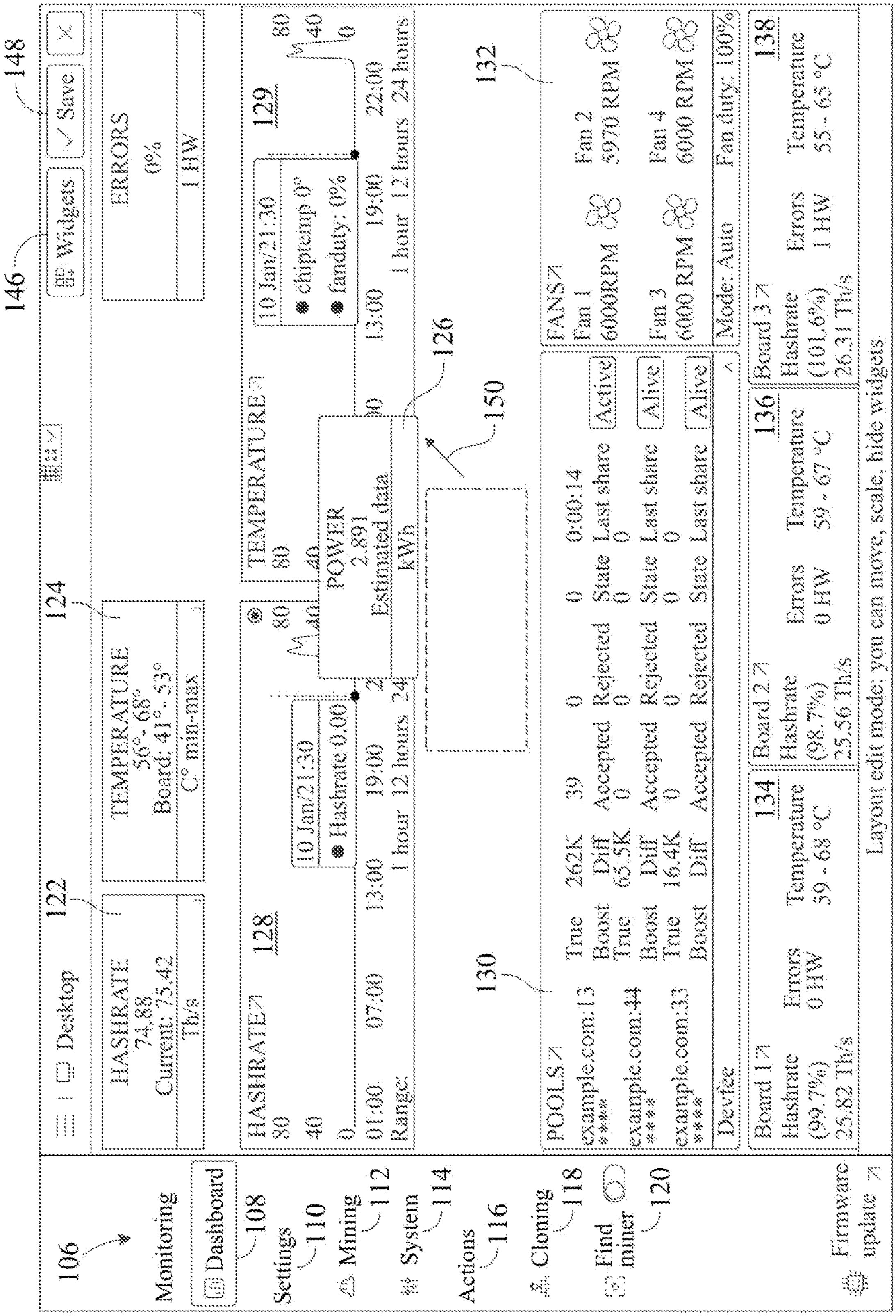
FIG. 6 is a graphic user interface illustrating the dashboard screen in an unlocked, edit mode, showing a widgets tab for accessing a widget screen used to customize the dashboard screen, and showing a widget drag/drop feature for further customizing the layout of the dashboard screen.
Figure 8:
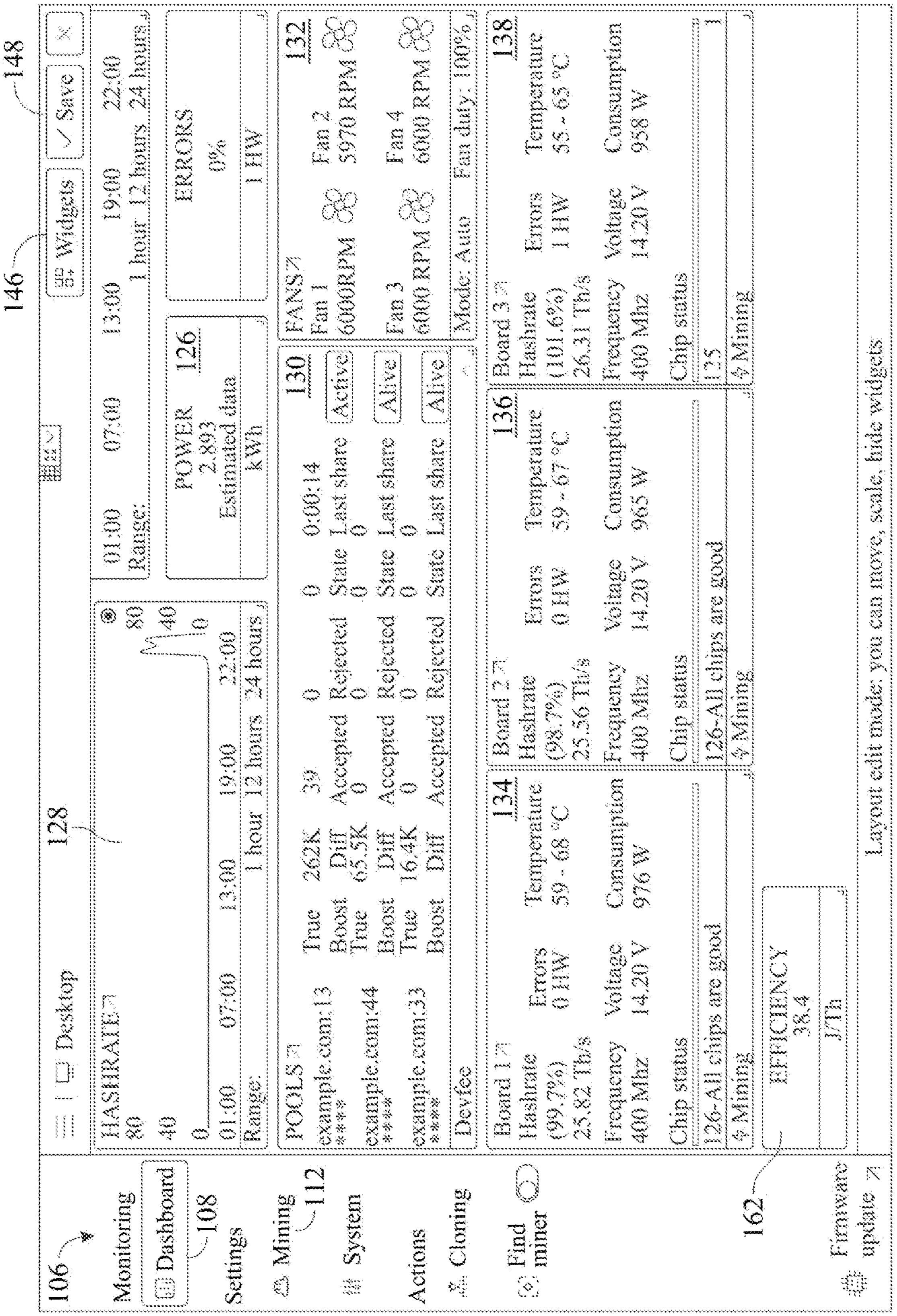
FIG. 8 is a dashboard screen that includes a user selected widget associated with an efficiency value of a cryptocurrency miner.

Upon initiating the customize operator 142 in FIG. 5, operators are subsequently directed to a dashboard screen 100 that provides a widgets tab 146, and a save tab 148 that are each associated with functionalities for customizing dashboard screen 100 with a plurality of widgets, as shown in FIG. 6. During a customize interface process 52 noted in FIG. 3, the one or more processors 22 execute(s) computer instructions directed to a widget configuration process 62 hosted in memory 23 for customizing the dashboard screen 100 layout with a plurality of widgets 122, 124, 126, 128, 129, 130, 132, 134, 136, 138 preselected by users. Authorized operators may utilize a widget selection process, and optionally a widget drag and drop process 66. To begin customizing the graphic user interface comprising the dashboard screen, operator's activate widget tab 146 to garner access a widget screen 200, as shown in FIG. 7, that provides a widget menu 152 including a list of g widgets that are each associated with dynamic or metric data that corresponds to operational parameters of miners 12, 14, 16, and/or of sensors coupled to the miners. As shown, selecting a plurality of widgets via, widget menu 152, is made available on user device 18. The widget menu 152 is operatively associated with widget module 64, and widget library 65 hosted in memory 23. The widget library 65 stores a plurality of widget files corresponding to each widget which may be indexed, categorized, filed, or grouped, according to preference, alphabetically, type, function, color, or shape, dimension, performance standard, type of chart, etc. For example, widget library 65 may include a group of widgets that are categorized according to certain chart sizes, shapes, or graphs, or a group of widgets that comprise generally square shapes or dimensions, or a group of widgets that comprise only temperature values or hash rate measurements. Widget module 64 works with processor 22 to process selected widgets from the widget library 65, and generate a layout of selected widgets on the dashboard screen 100 for viewing on display of user device 18. Other widgets may also be included for example, an errors widget 202, a DEVFee widget 204 for calculating what the total fee of the DTFP 28 is by running an equation to compare the fee of the devfee pool versus the user's pool, a foundblocks widget 206, and a bestshare widget 208. As shown in FIG. 7, a radio button, or entry box is provided adjacent each listed widget for operators to select the user-preferred widget of interest to customize dashboard screen 100. In one non-limiting embodiment, widget menu 152 may include additional widgets comprising, for example, but not limited to, one or more widgets associated with data or information attributed to digital currency price, price of electricity, profit values, costs, value of difficulty, chip voltage values, chip frequency values, immersion oil temperature values, chip voltage charts, chip frequency charts, profits chart, price chart, mining costs, or other data or information of miners 12, 14, 16. Once preferred widgets are selected, via the radio buttons, operators implement the selection by initiating a select icon 160 provided at the lower part of the widget menu where the selected widgets are processed, and generated in a widget layout on dashboard screen 100, as shown for example in FIG. 8. For illustrative purposes, an authorized user has selected an efficiency widget 162 by checking the corresponding entry box in widget menu 152. Upon initiating select icon 160, the one or more processors 22, and/or widget module 64 executes instructions associated with the widget selection process to generate a customized dashboard screen 100 including the efficiency widget 162, as illustrated in FIG. 8. It is appreciated that upon completing the customization process for dashboard 100, and initiating the select icon 160, the customize interface process 52 simultaneously creates a customized graphic user interface file (a customized dashboard file) that comprises the latest instructions, code, and application for generating the customized dashboard screen 100, where the CGUI file is stored in either the widget library 65, in memory 23, or on an external device, or external memory. It is appreciated that multiple CGUI files can be created and stored accordingly. In one embodiment, a newly created CGUI file can be processed to overwrite an older, previously created CGUI file every time a dashboard screen 100 is customized by authorized users. In one embodiment, a CGUI database may be created to store a plurality of CGUI files that may be indexed in accordance with frequency of use, date and time created, or stored in accordance with certain attributes of miners. For example, a first and a second CGUI may be stored for a first miner 12, while a third and fourth CGUI may be stored for a second miner 14. One or more customized graphic user interfaces CGUI (customized dashboard file comprising a customized dashboard screen) can be exported to an external storage device, server, or stored on a cloud-based management system, and made accessible by a user device 18, and/or miner, or downloaded into memory on each miner. It one embodiment, one or more customized graphic user interfaces CGUI (customized dashboard file comprising a customized dashboard screen) can be exported to an external storage device, server, or stored on a cloud-based management system, and downloaded at a later date and time onto predetermined miners.

Alternatively, operators may prefer to initiate a default operator 161, where widget module 64 communicates with widget library 65 to automatically select, and customize a dashboard screen 100 with a predetermined group of widgets that have either been predetermined by users, are selected in accordance with certain miners, or are simply random default widgets. In yet another embodiment, widgets can be automatically selected from widget library 65 via an auto-selector module (not shown) that communicates with widget module 64, widget library 65, memory 23, and processor 22 to dynamically select or automatically select, and customize the dashboard screen 100 based on certain features such as, but not limited to, the type or model of miner. For example, the DTFP 28 may collect hardware data from miners 12, 14, 16 such as data or information corresponding to hash boards 29, 31, 34, or mining chips 36, 38, 40, 42, 44, 46, or number of mining chips employed on each hash board, or detect the operation of fans, by communicating with the processor 22, memory 23, and/or with a peripheral interface controller (PIC) provided on each hash board of the miner. The collected hardware data is subsequently processed by the auto selector module to determine what widgets operatively correlate with operational parameters of miners associated with the collected hardware data. An auto select operator (not shown) may be provided on the widget menu 152. As such, the graphic user interface 30 can be dynamically updated based on changes in hardware data, and/or miners. The difference between the default operator, and an auto select operator is that in the default process the one or more widgets employed comprise a plurality of widgets that have been prestored or preconfigured in advance, or are randomly chosen widgets, whereas in the auto select process, the one or more widgets employed are dynamically selected based on the hardware data or information collected from the DTFP 28 that is used for managing and controlling each miner 12, 14, and 16.

A further method of customizing the graphic user interface comprising the dashboard screen 100 may include a drag/drop process 66, as better illustrated in FIGS. 3 and 6. The drag/drop process 66 permits users or operators to move, and relocate any of a plurality of widgets at various locations or positions within the layout space of the dashboard screen 100. It may be important for operators to reorganize the location of widgets on dashboard screen 100 for various reasons. For example, operators may wish to place a temperature widget 124 adjacent a temperature chart or graph 129 to more accurately compare or correlate temperature values, or position hash board widgets 134 136, 138 adjacent each other to compare functionality of each hash board while mining digital currency, or place a widget having greater importance to the forefront for operators to quickly monitor more important metric data. During a drag/drop process, operators select a widget of interest, such as a power widget 126 corresponding to power consumption of a miner 12, 14, 16 shown in FIG. 6, and drag the power widget 126 in any general direction as denoted at 150. Once the power widget 126 is located at a preferred position on the layout space of the dashboard screen 100, the power widget 126 is subsequently dropped in position. Authorized operators may drag and drop any widget 122, 124, 126, 128, 129, 130, 132, 134, 136, 138 to any position or location desired on dashboard screen 100. As noted, each widget 122, 124, 126, 128, 129, 130, 132, 134, 136, 138 is adjustable in size and/or dimension as well. Once operators have completed customizing the dashboard screen 100 by either selecting widgets from the widget menu 152, and/or dragging/dropping widgets in desired positions on the dashboard screen 100, the customized interface configuration is implemented by initiating the save icon 148 as shown in FIG. 6 whereupon a customized, graphic user interface file CGUI (a customized dashboard interface file) is generated, and subsequently or simultaneously saved in memory. Where multiple graphic user interfaces are customized for different groups of miners 12, 14, 16, it is noted that authenticated operators can access any one of the miners 12, 14, 16 included in a first group of miners to edit a first CGUI, if needed, and/or access any one of the miners 12, 14, 16 included in a second group of miners to edit a second CGUI if needed. As such, authenticated operators, for example, do not have to access each and every miner 12, 14, 16 in each group to edit or make changes to previously customized user interfaces.

Advantageously, users can tailor the customized dashboard screen 100 in accordance with a particular type or model of miner employed, the geographic location of miners 12, 14, 16, and/or in accordance with a particular application of miners. For example, in situations where miners are immersed in oil for cooling, widgets associated with data or information corresponding to fans are not employed. Also, in situations where mining pools are not utilized, widgets associated with data or information corresponding to mining pools are not employed. In situations where miners 12, 14, 16 operate in geographical regions that provide colder environmental temperatures, data or information corresponding to temperature of hash boards or mining chips may be of less concern, and widgets associated with such dynamic or metric data of temperature sensors may be of less interest. As such, there may be provided a plurality of preconfigured dashboard screens 100 where each of the plurality of preconfigured dashboard screens includes a different configuration or layout of widgets. For example, a first preconfigured dashboard screen may include widgets associated with data or information corresponding to hashrate 122, temperature 124, fans 132, and hashboards 134, 136, 138, while a second stored preconfigured dashboard screen may include widgets associated with data or information corresponding to power 126, hashrate chart 128, and fans 132. In one embodiment, each preconfigured dashboard screen may be assigned a dashboard interface identifier that is stored in the widget library 65, and processed by widget module 64, or stored in memory 23 on each miner 12, 14, 16. In one embodiment, operators may be prompted to select an interface identifier provided in the widget menu 152 for operators to select a preconfigured dashboard interface via, the interface identifier. Such interface identifiers may be assigned a name, code, number, letters, label or description to define the type of dashboard screens available. The interface identifiers allow operators to quickly and easily generate a dashboard screen 100 having a particular, preconfigured layout of widgets saving users time and effort. This procedure eliminates the need for operators from having to customize a host of dashboard screens 100 in circumstances where the type or model, geographic location, or application of miners changes quickly. Quickly configuring a dashboard screen 100 means more time spent mining digital currency, and less down time. In one alternative embodiment, interface identifiers maybe stored on an external device such as an external server that upon communication from one or more miners 12, 14, 16, checks its memory for a graphic user interface template configuration mapped to interface identifiers, retrieves the appropriate customized, graphic user interface attributed to the mapped interface identifier, and transmits the retrieved graphic user interface to designated miners 12, 14, 16. Operators communicate with the miners 12, 14, 16 via, user device 18 to display a layout of widgets on the display of the user device 18 according to the applied graphic user interface transmitted. Upon creating the visual graphic user interface, the user device 18 may display metric data of miners corresponding to the widgets displayed.

With continued reference to FIG. 8, dashboard screen 100 includes a mining tab 112 for displaying operating settings of miners 12, 14, 16 including for example, pooling, cooling, and performing information, various advanced data, current hashrate of each individual hash board 29, 31, 34, voltage, frequency, temperatures, and estimated power consumption. It also shows how many mining chips 36, 38, 40, 42, 44, 46 are under performing by producing a numerical message, or color markers, and provides information regarding fees.

Figure 9:
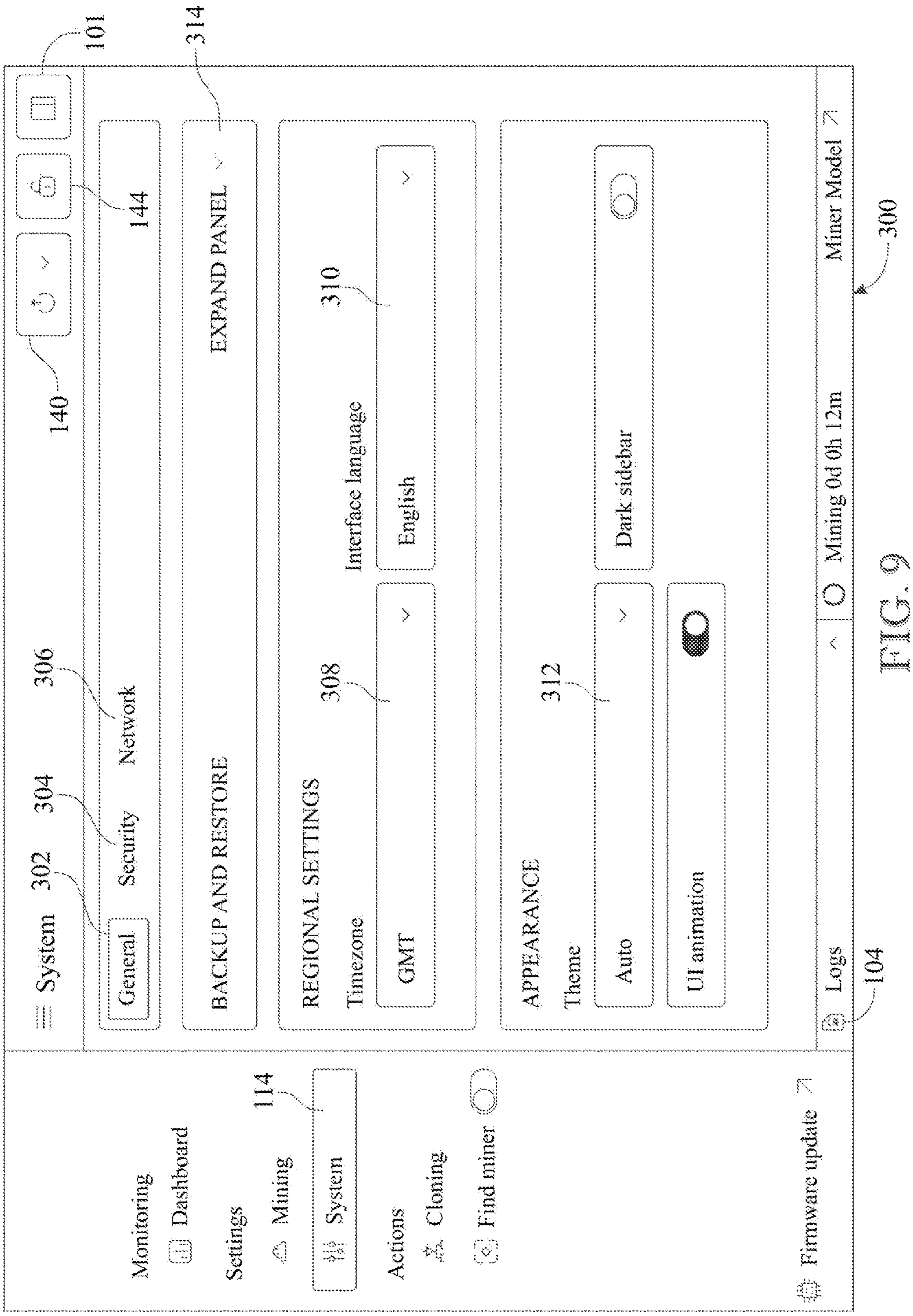
FIG. 9 is a graphic user interface illustrating a system screen, showing general settings, security settings, and network settings configured by users for selected cryptocurrency miners.

Referring now to FIG. 9, there is provided a graphic user interface showing a system screen 300 accessible via, a system tab 114 for configuring and setting various functionalities of the interface. A system settings process denoted at 68 in FIG. 3, initiates the processor to generate a system screen 300 including data and information associated with a general tab 302, a security tab 304 for setting new passwords, enabling or disabling SSH, and define certain ports, and a network tab 306 for configuring network settings including hostname, DHCP, IP address, mask, gateway, and dns settings. Initiating the general tab 302 provides a backup or restore feature including an expandable operator 314 that allows operators to backup configuration settings of miners 12, 14, 16, restore the configuration settings for all miners 12, 14, 16, or reset the firmware stored on miners. A regional settings is provided for setting time zones 308 in which miners 12, 14, 16 are operating, and an interface language settings 310 is provided to set the language of the GUI. Additional settings are provided to configure appearance attributes including theme 312, shade color of the sidebar banner, and interface animation. It is appreciated that the theme setting 312 allows users to choose an auto setting where the GUI automatically adjusts the shade/intensity/color/background light based on the time of day where for example, a darker shade is used during the day, and a lighter background shade is used at night. Theme setting 312 also provides for a choice to select a light shaded background, or alternatively, select a dark shaded background. It is understood that the theme setting 312 may provide a drop-down menu that includes a list of options to choose from in setting the shade/intensity/color/background light of the GUI.

The security tab 304 provides access to various information including the ability to change a user's password, and add API keys as well. Other security features may be added from time to time, and made available to users for configuring the GUI. It is also noted that the miner firmware program 28 can be easily updated with new firmware by simply activating the firmware update icon provided where a firmware update screen is presented to users for dropping and uploading an updated firmware file with ease.

To garner larger profits, and improve the competitive edge of obtaining more digital currency rewards, mining often involves hundreds, or thousands of miners conjugated on mining farms that operate simultaneously to perform mathematical computations for obtaining digital currency rewards. The need to customize a GUI 30 for each and every miner 12, 14, 16 is extremely burdensome, time consuming, costly, and impractical to say the least. Advantageously, the present disclosure allows operators to customize various dashboard screen interfaces for different groups of miners such as for example, customizing a first GUI 30 for a first group of miners 12, 14, 16, and customizing a second GUI 30 for a second group of miners different from the first group of miners, and so on. Users can export the customized dashboard screen interface to an external storage device, and employ software/hardware to transfer the exported CGUI file to designated miners. In one embodiment, users can initiate a cloning process for cloning a customized graphic user interface (i.e. cloning a customized dashboard screen interface, hereafter referred to as CCGUI), and subsequently transfer the CCGUI file to predetermined or predesignated miners 12, 14, and 16.

Figure 10:
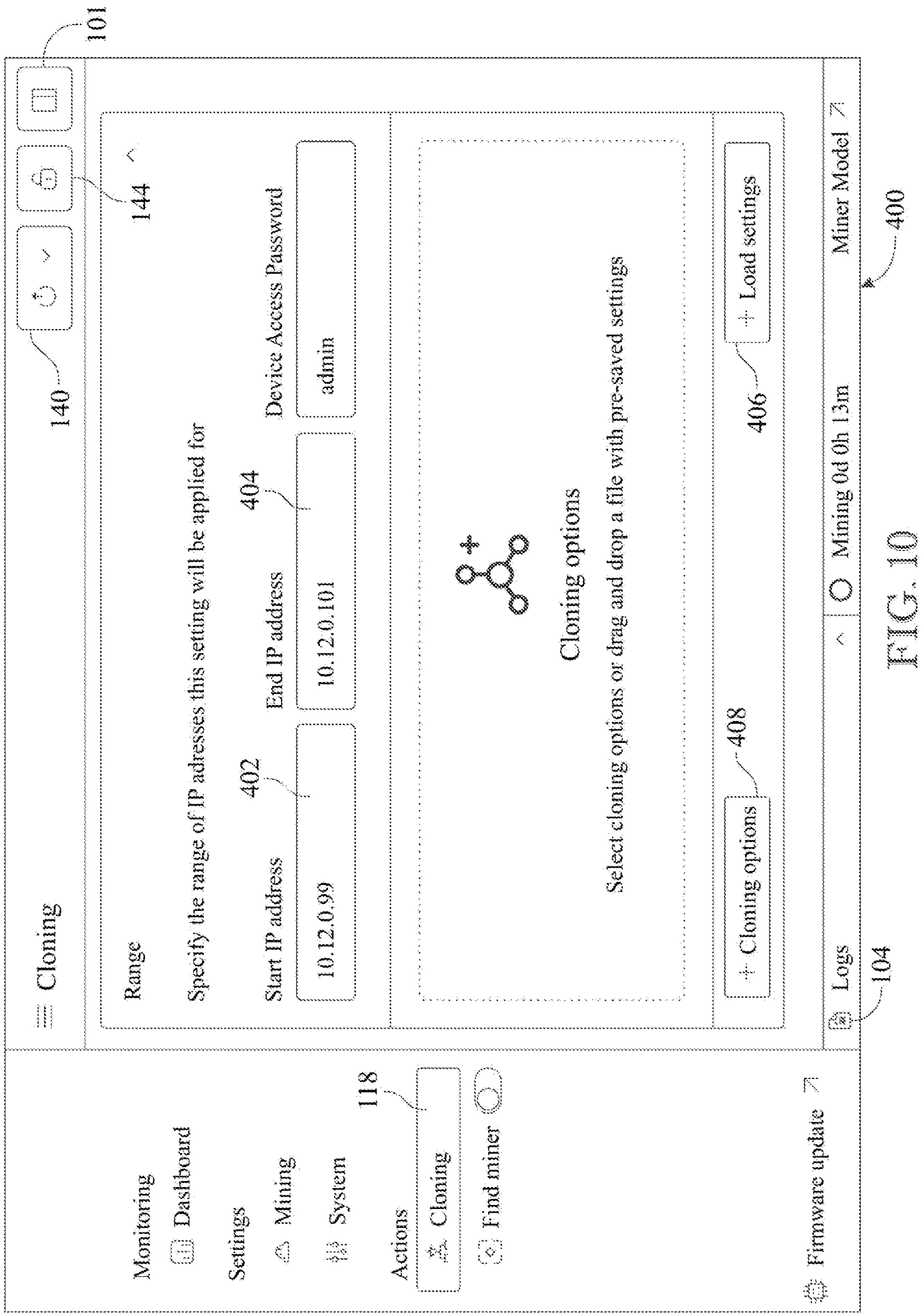
FIG. 10 is a graphic user interface illustrating a cloning screen, showing a range of designated, predetermined cryptocurrency miners, each associated with an internet protocol address entered by users for transmitting a cloned, customized graphic user interface file to each selected miner.
Figure 12:
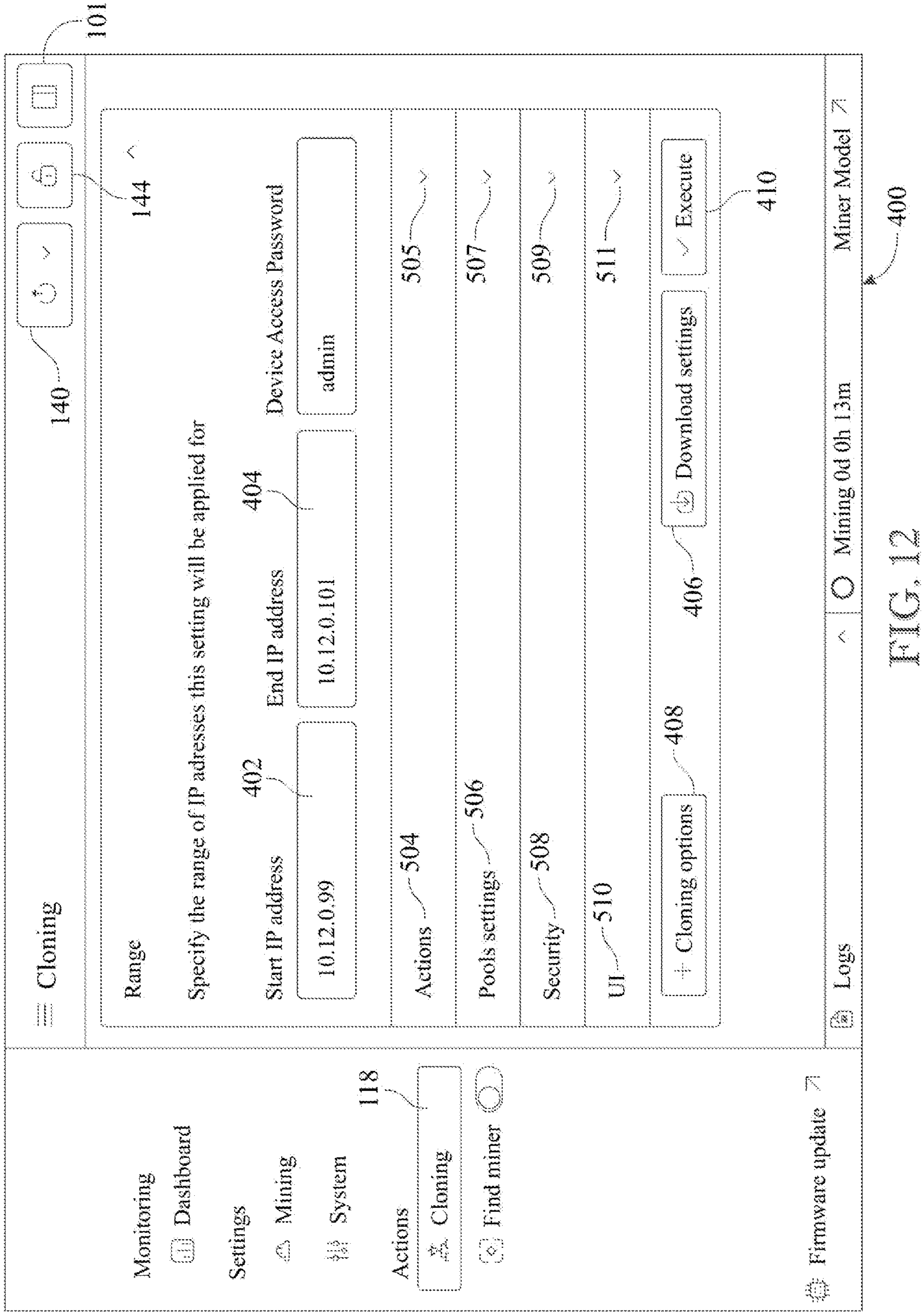
FIG. 12 is the cloning screen, showing clone operators selected from the pop-up menu of FIG. 11, and implemented in preconfiguring the cloned, customized graphic user interface file.

The cloning process begins by initiating a cloning tab 118 provided in dashboard banner 106 to access a cloning screen 400, as shown in FIG. 10. In practice, the one or more processors 22 executes computer instructions directed to a cloning process 54 that is stored in a computer-readable medium, or memory 23. Upon accessing the cloning screen 400, a clone configuration process begins via, a configuration and generating process 74, 76, respectively, in FIG. 3. In practice the cloning process generally begins by identifying what miners are to receive a CCGUI file. As shown in FIG. 12 users predetermine what group of miners are selected to receive the CCGUI file. As such, users enter a range of internet protocol addresses (IP) that each correspond to a miner 12, 14, 16 in the predetermined group of miners. The selected range of miners begins by entering a starting IP address denoted at 402, and terminating with an ending IP address 404 where the process is governed by a miner selection process 72. As such, operators can predesignate what group of miners will receive the CCGUI file to be hosted in memory 23 on each miner 12, 14, 16, or hosted on an external device, or on external memory device, or onto a cloud-based management system, and subsequently downloaded to each miner specified in the range of miners.

Figure 11:
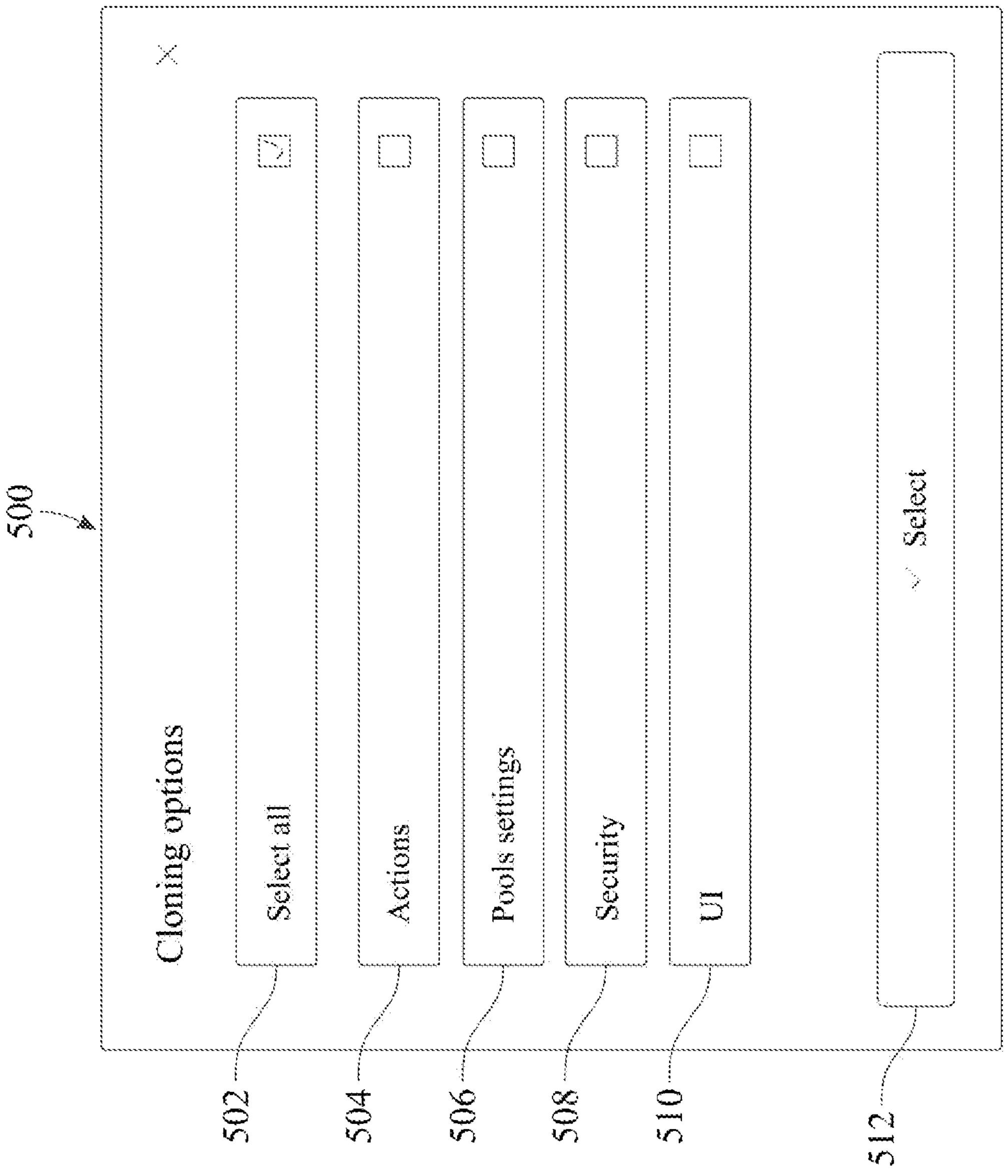
FIG. 11 is a graphic user interface illustrating a cloning options screen, showing a list of cloning operators selectable by users for configuring and generating a cloned, customized graphic user interface file.
Figure 13:
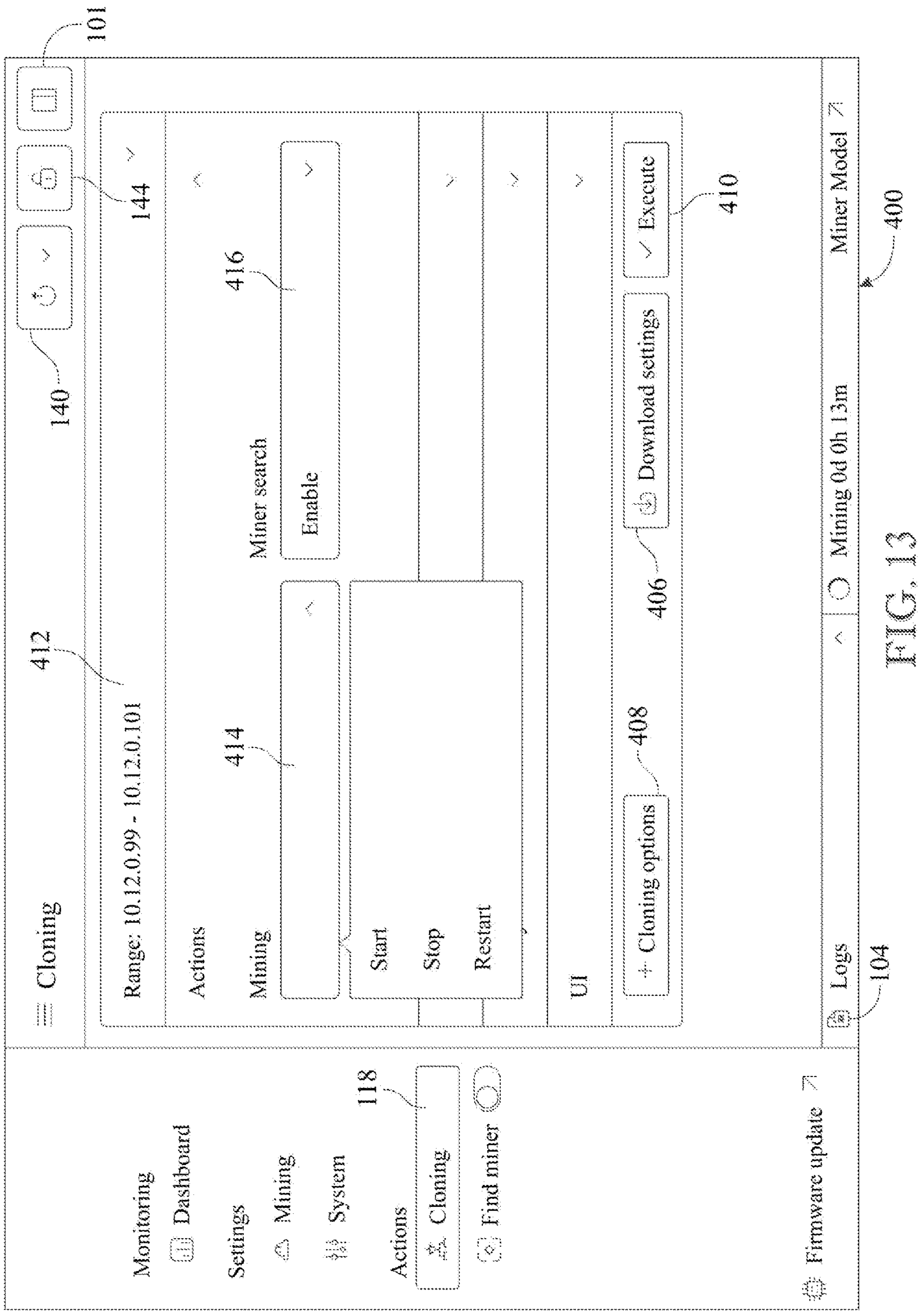
FIG. 13 is the cloning screen of FIG. 12, showing an expanded view of the actions cloning option, and drop down menu of operation states of a selected miner.

Once a designated range of miners 12, 14, 16 is configured, a cloning options icon 408 is subsequently initiated to access a cloning options screen 500, as provided in FIG. 11, to configure various cloning features for miners 12, 14, 16 provided in the designated range. The cloning options screen 500 provides multiple options for users or operators to employ during the clone configuring process. For illustrative purposes only, a select all option feature 502 is provided to select all available options including an actions option 504, a mining pools setting option 506, a security option 508, and a user interface option 510, as shown in FIG. 11. A check entry box is provided adjacent each cloning option for operators to select from. Some cloning options may be for setting frequency and/or voltage profiles, or for setting autotune profiles, power consumption target values, or chip hashrate target values. Each cloning option selected and implemented includes an expandable operator denoted at 505, 507, 509, 511 to expand related configuration settings, as shown in FIG. 12. For example, when expandable operator 505 associated with actions option 504 is initiated, an area on the cloning screen 400 expands to enter configuration settings 414 directed to operation of miners 12, 14, 16 including a start, stop or restart operation, as shown in FIG. 13. Also provided is a miner search 416 for supporting functionality of the find miner tab 120 enabling miners 12, 14, 16 to electrically activate visual indicators such as lights for technicians or operators to find in mining farms.

Figure 14:
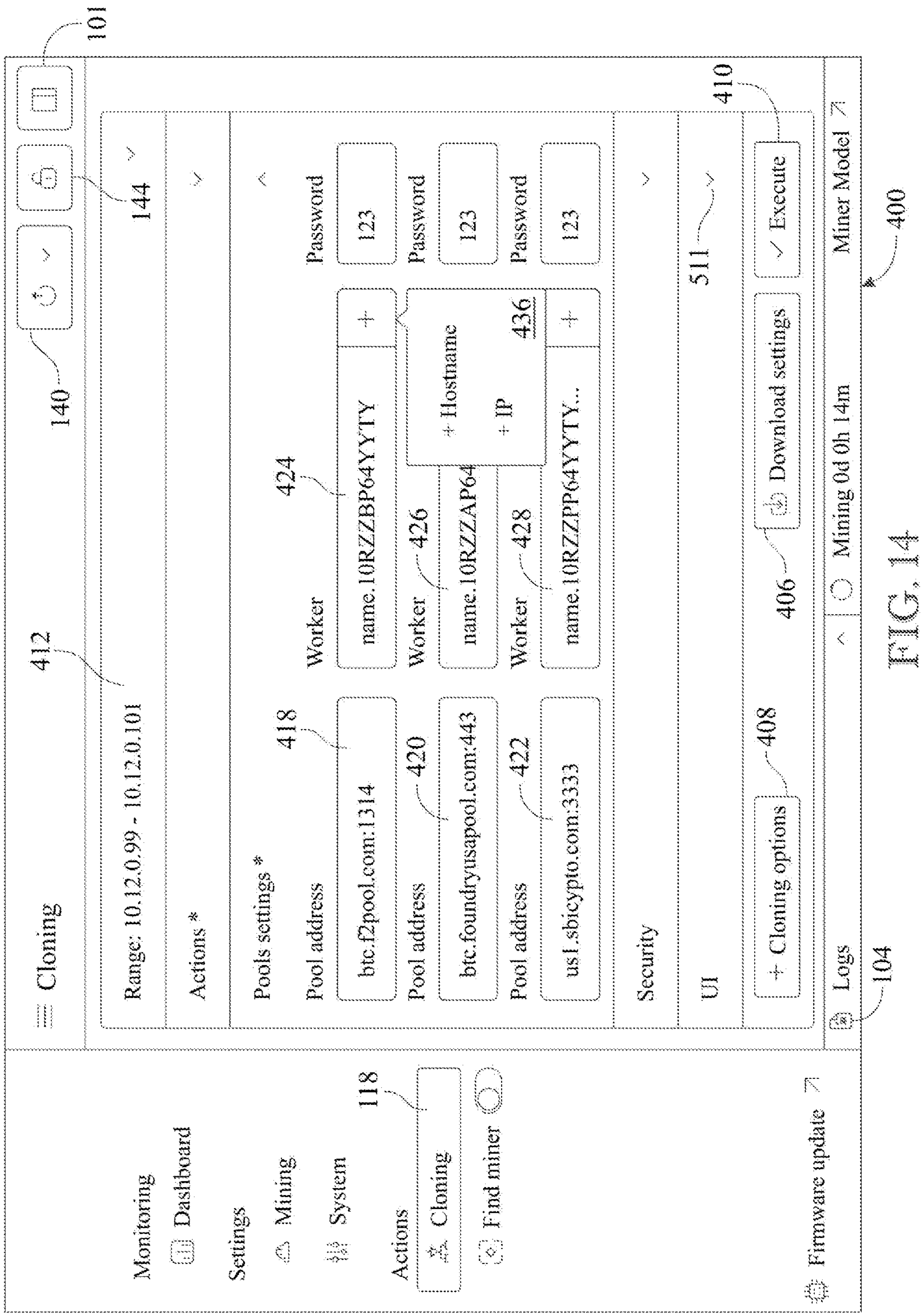
FIG. 14 is the cloning screen of FIG. 12, showing an expanded view of the pools setting option, and information associated with mining pools, and cryptocurrency miners.

Upon initiating expandable operator 507 adjacent pool settings 506 in FIG. 12, an area on the cloning screen 400 expands to configure pooling settings of miners 12, 14, 16 for each miner provided in the range of miners, as shown in FIG. 14. Operators may wish to configure miners 12, 14, 16 to operate in designated mining pools as well. For example, miners 12, 14, 16 may be directed to operate in a first, designated mining pool, and if that first, designated mining pool fails for some reason, the configuration directs the selected miners 12, 14, 16 to operate in a second, designated mining pool, if that second, designated mining pool fails for some reason, the configuration directs the selected miners 12, 14, 16 to operate in a third designated mining pool, and so on. Configuring mining pools begins by providing a mining pool addresses associated with a first mining pool 418, a second mining pool 420, and a third mining pool 422. It is noted that additional mining pools may be provided. As shown in FIG. 14, a miner 12, 14, 16 identified by a worker name, and a sub name is assigned to operate in preconfigured mining pools. The worker name, and sub name identifies the miner 12, 14, 16 participating in the corresponding mining pool. Each miner 12, 14, 16 provided in the range of miners 412 will have the same worker name, and sub name. In one alternative embodiment, the sub name may comprise an IP address of the miner 12, 14, 16. An identifier block 436 is provided to assign a host name, and/or IP address to each miner 12, 14, 16 which may use either to replace a sub name, or provided in addition to the sub name.

Figure 15:
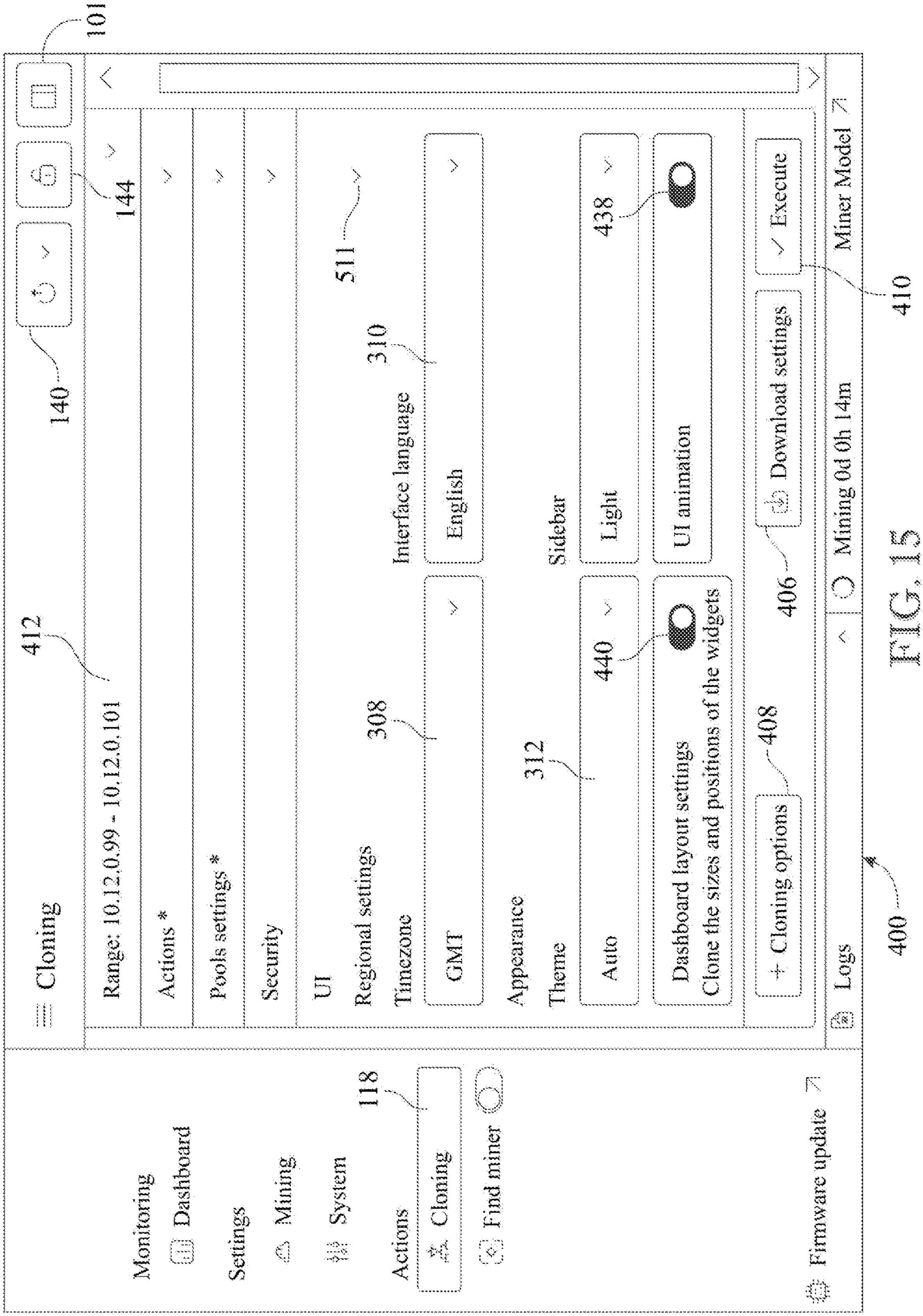
FIG. 15 is the cloning screen of FIG. 12, showing an expanded view of the UI animation cloning option, and various settings including the ability to configure a time zone, an interface language, an appearance theme, and select a customized dashboard screen operator.

In practice, operators may select expandable operator 511, in FIG. 12, to further undertake a configuration settings process where various interface settings of the GUI 30, operational state of miners 12, 14, 16, and/or the aesthetic appearance of certain screens/views of the GUI 30 are configured, as illustrated in FIG. 15. For example, upon expanding the configuration window corresponding to UI, operators can configure a regional time zone 308 of working miners 12, 14, 16, and/or select an interface language 310, and/or configure the appearance of the GUI 30 (dashboard screen interface) such as setting the theme 312, the shade of the sidebar, or select certain animation features 438.

The cloning process 54 includes cloning configuration settings of the GUI 30, and miners 12, 14, 16, such as configuring the regional settings, pooling settings, theme, animation, language, operation state of miners, or security, or in one alternative scenario, cloning the configuration settings of the GUI 30, and miners 12, 14, 16, along with cloning the CGUI file. In certain circumstances, operators may wish to retain default configurations of widgets, and choose not to clone the CGUI file. As such, the cloning screen 400 gives operators a choice to clone the CGUI file or not. It is noted that activating the clone operator 440 initiates the cloning process 54 to retrieve the CGUI file previously created during the cloning process. Alternatively, activating the cloning process 54 may require users to initially customize a GUI before cloning the customized GUI.

After configuring all necessary settings, users can initiate the dashboard layout settings tab 440, in FIG. 15 to also clone the sizes and positions of the plurality of widgets that were previously selected during the customization phase. Users then proceed to activate either the download settings icon 406 or the execute bottom 410. Upon activating the download settings icon 406, a CCGUI file is hosted on an external device such as an external computer, a server, a database, external memory, or onto a cloud based management system, and subsequently transferred from the external device onto the computer-readable medium or memory 23 of each miner 12, 14, 16 that was provided in the range of miners via, each IP address in FIG. 12, or transferred to any miner of interest. Alternatively, upon activating the execute icon 410, the CCGUI file is transferred to the computer-readable medium, or memory 23 of each miner 12, 14, 16 provided in the range of miners, and accessible by the user device 18 for viewing the CCGUI (the cloned customized dashboard screen interface). The one or more processors 22 of each miner 12, 14, 16, communicates with the computer-readable medium, or memory 23 to process and execute the instructions or code attributed to the transferred CCGUI file to render the information to a processor provided on the user device 18 that processes the CCGUI file information, and produces the customized dashboard screen layout of the plurality of widgets on a display of the user device 18. The customize interface process includes a render cloned file display process where the cloned customized graphic user interface is rendered onto a display of a user device 18 allowing users to view the layout of selected plurality of widgets on the display of the user device 18 based in one embodiment, on certain display attributes.

Figure 16:
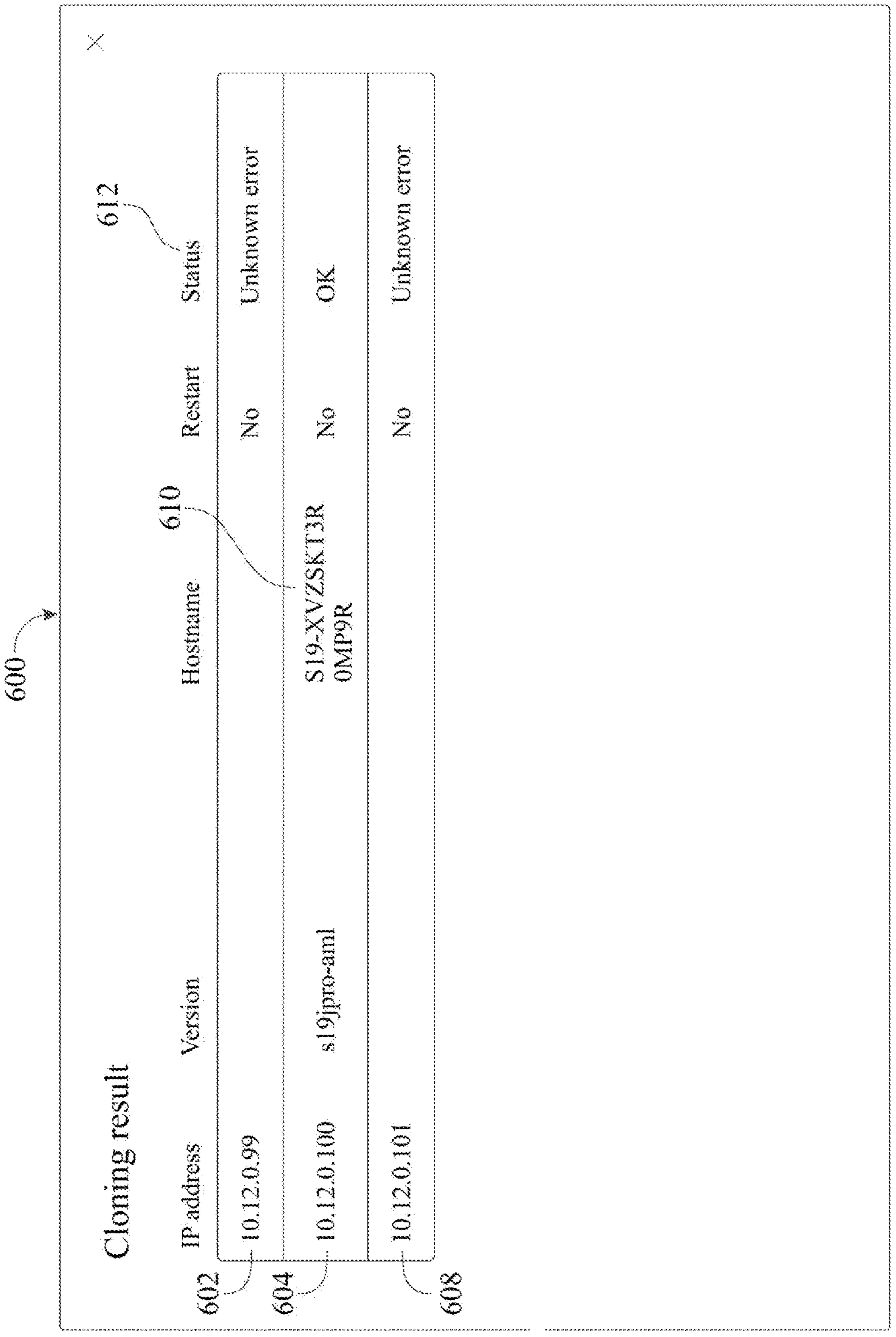
FIG. 16 is a graphic user interface illustrating a cloning result screen, showing a list of miners designated in the selected range of miners in FIG. 10 that have successfully received a cloned, customized graphic user interface.

After initiating either the download settings icon 406, or the execute icon 410, operators may wish to ascertain whether the CCGUI file was transferred successfully to each designated miner 12, 14, 16. To support this approach, there is provided a cloning results screen 600, as shown in FIG. 16, for visually indicating what miners 12, 14, 16 listed in the range of miners, have successfully received the CCGUI file (cloned customized dashboard screen interface). A cloned checking process checks each IP address of each miner listed in the range of miners 12, 14, 16 to determine if the miners 12, 14, 16 are active, and if so, proceeds to transfer the CCGUI file to the detected miner. As shown in FIG. 16, the cloned checking process found one active miner for uploading the CCGUI file to memory of the miner 12, 14, 16 as represented by an OK status indicator. If during the cloned checking process a miner 12, 14, 16 is deemed not active and cannot be identified for receiving the CCGUI file, there is provided an unknown error status indicator in the cloning result screen 600.

Figure 17:
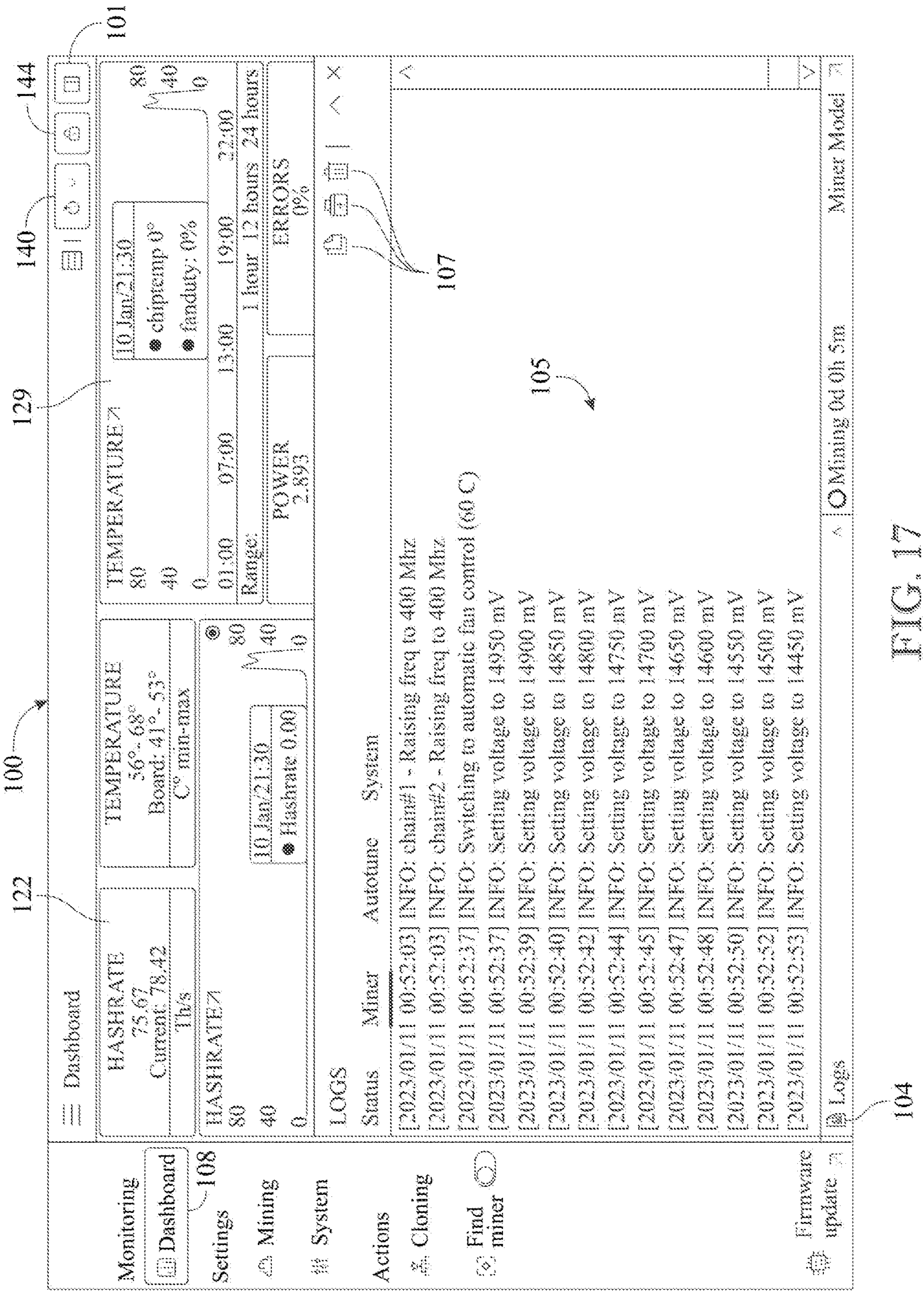
FIG. 17 is the dashboard screen, showing an expanded log window including metric data of a designated cryptocurrency miner displayed sequentially in real-time.

Operators may also wish to monitor past, or dynamic or metric data corresponding to various operational parameters of miners 12, 14, 16 in real time while mining digital currency. Users can initiate a data log icon denoted at 104 in FIG. 14 for example, to access an expanded log window 105, as shown in FIG. 17. The expanded log window 105 provides data and/or information corresponding to the various metric data of miners 12, 14, 16 including for example, providing various miner settings or configurations, displaying values attributed to chip voltage settings, information pertaining to fan control, chip frequency settings, power consumption, or other data. The data or information can be copied, exported to an external storage device or memory, or deleted using various operators denoted at 107. For added convenience, it is appreciated that the data or information is presented in real-time with the most up-to-date data being displayed at the bottom of the data log list so operators can quickly and easily review the metric data or information of a selected miner, or miners, ranging from the most recent time and/or date to the latest time and/or date. It is appreciated that a clear log operator is provided to clear the data log section 105 of data and/or information if desired.

Figure 18:
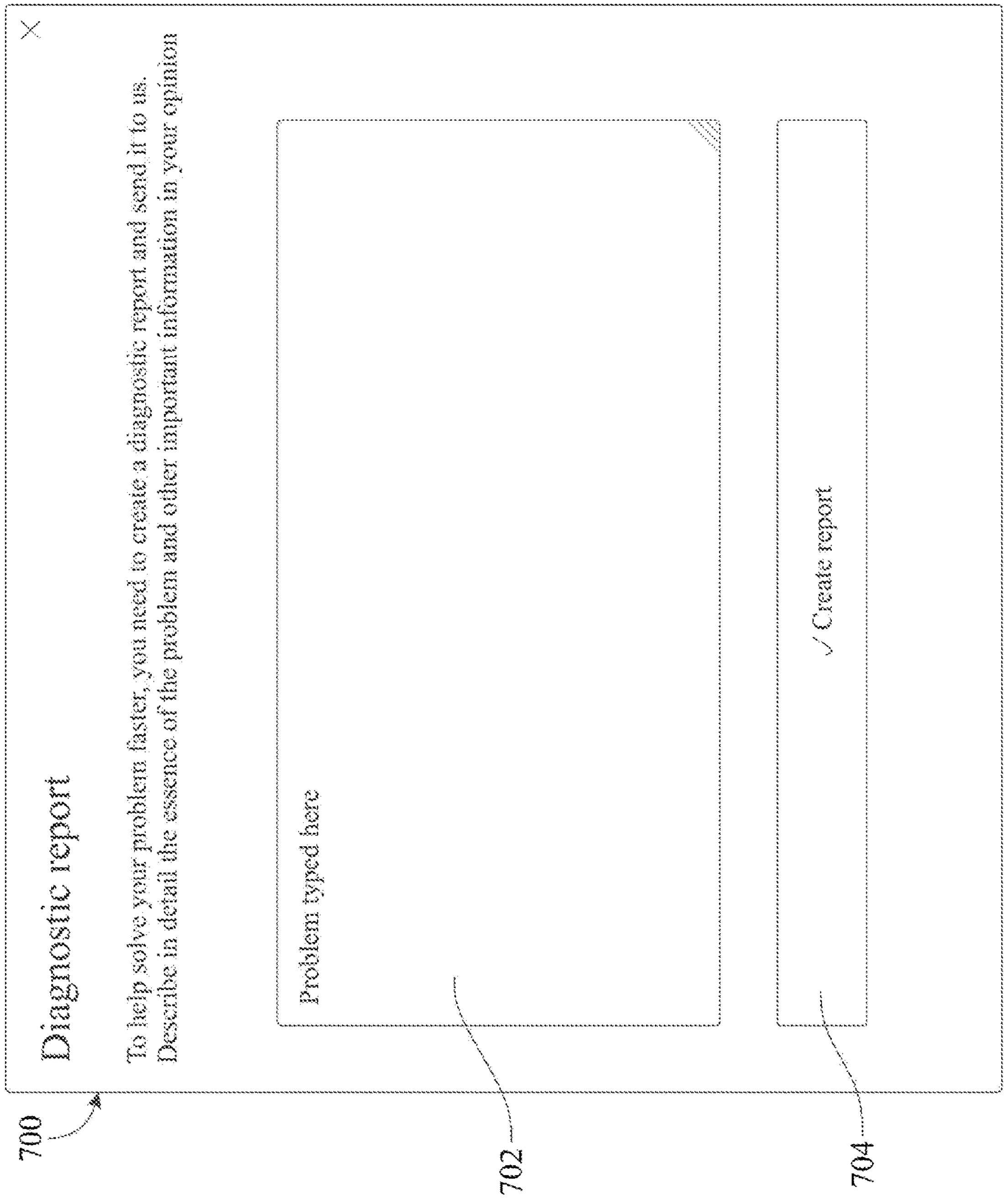
FIG. 18 is a graphic user interface illustrating a diagnostic report interface, showing an entry box for generating a status report associated with a cryptocurrency miner, and allowing users to save, and export the diagnostic report.

Conveniently, GUI 30 also provides for a diagnostic report screen 700, as shown in FIG. 18, for documenting or recording certain issues associated with the operation status of miners 12, 14, and 16. The diagnostic report screen 700 is provided for users to document the nature of the problem (s) in a designated area 702, and to subsequently generate a diagnostic report via, the create report tab 704 where the generated, diagnostic report may be stored in memory, exported to an external storage device or database, uploaded onto a cloud-management system, or transmitted or sent to designated personal via, email or text.

Figure 19:
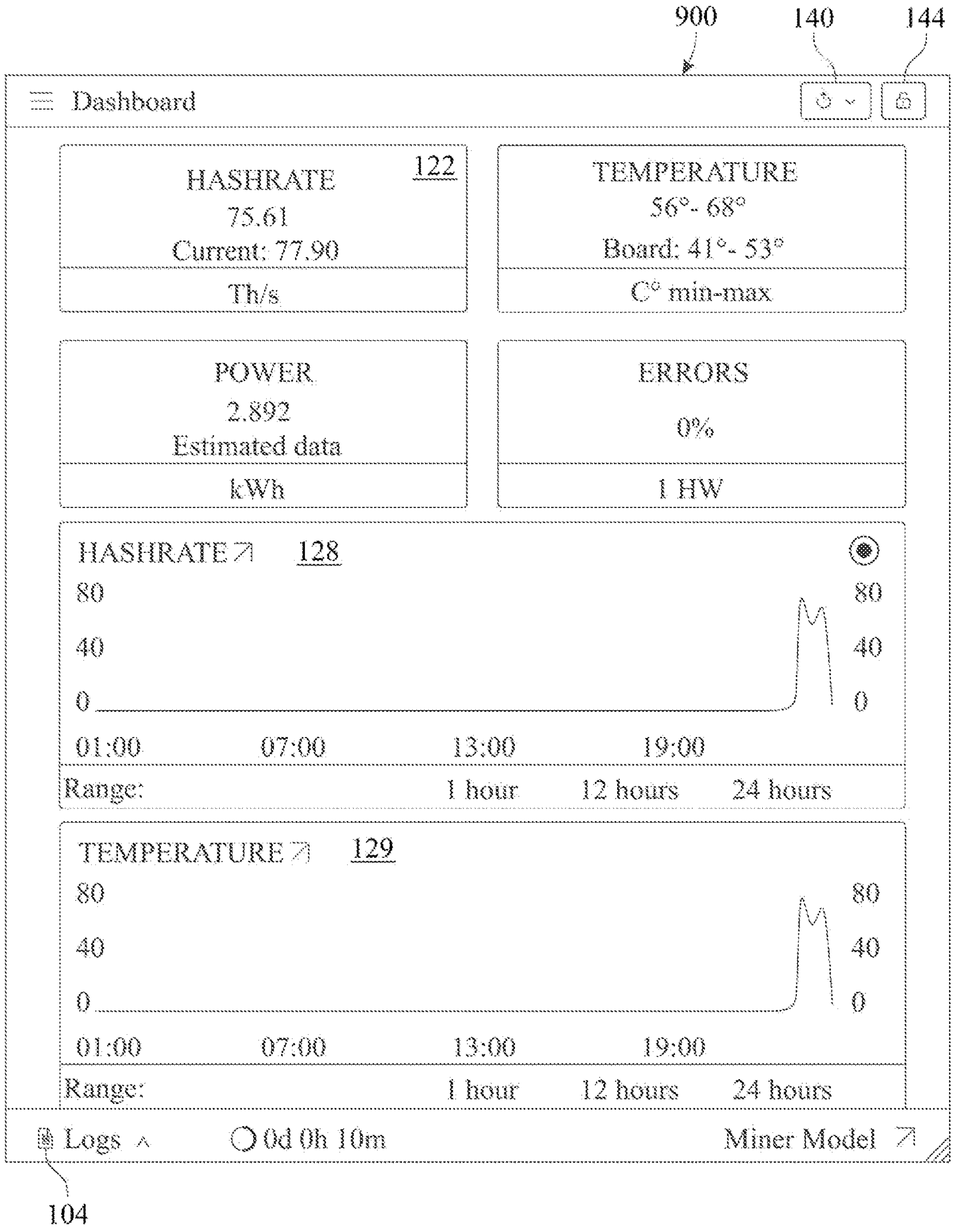
FIG. 19 is a graphic user interface illustrating a dashboard screen, showing a layout of widgets for display on a remote user device such as a smart phone.

As noted, operators may access each miner 12, 14, 16 via, a local or remote user device 18 that comprises, in one embodiment, a mobile phone. The software/app platform 26 is able to ascertain and display the correct display format of GUI 30 based on one or more display attributes including for example, a meta view-point value provided in a control program such as a browser. Thus, if a user device 18 comprises a mobile phone, there is provided a dashboard screen 900 that provides for a slightly different layout of widgets as shown in FIG. 19. In practice, operators can scroll up and down to view the plurality of widgets on the display screen of the mobile device, and monitor the metric data of selected miners 12, 14, 16. As shown, users can also view data logs by initiating data log icon denoted at 104.

In one non-limiting embodiment, GUI 30 may comprise a software interface, a hardware interface, or any combination thereof for enabling operators to view, edit, change, add, create, manipulate, input, save or store, print, command, submit, transfer, manage, navigate, and import/export, any and all data, and/or information associated with cryptocurrency mining machines 100. GUI 30 may include additional graphical elements including, but not limited to, icons, banners, drop down menus, entry boxes, designated inputs, check boxes, tabs, inserts, pop-ups, tool bars, query boxes, rows or columns of data or information, libraries, spreadsheets, expandable windows, scrolls, tables, menus, side bars, widgets, characters, figures, symbols, and other designed formats or configurations. In one embodiment, the GUI platform 30 may include a non-transitory computer-readable medium, or a computer-readable medium 23, that stores thereon computer-executable instructions that, when executed by the processor 22 that is in communication with the medium in a cryptocurrency miner including a plurality of hash boards each having a plurality of mining chips, causes the processor to generate a dashboard screen including a plurality of widgets, each of the plurality of widgets corresponding to various metric data corresponding to operational parameters of the cryptocurrency miner 12, 14, 16, establish communication between the cryptocurrency miner and a user device over a communication network, and render the dashboard screen including a layout of the plurality of widgets on a display associated with the user device where the dynamic data is being displayed in real time.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method of customizing a graphic user interface in communication with a cryptocurrency miner including a plurality of hash boards each having a plurality of mining chips, said method comprising the steps of:

providing in said cryptocurrency miner a processor in communication with a computer-readable medium storing thereon computer-executable instructions, that when executed by said processor, causes the processor to generate a dashboard screen including a plurality of widgets, each of said plurality of widgets corresponding to metric data associated with operational parameters of said cryptocurrency miner;

establishing communication between said cryptocurrency miner and a user device over a communication network; and rendering said dashboard screen including a layout of said plurality of widgets on a display associated with said user device, such that at least two of said plurality of widgets are arranged adjacent each other, and are simultaneously viewable on said display, said metric data displayed in real time.

2. The method of claim 1, wherein said metric data comprises any of hash rate values, voltage values of each of said plurality of mining chips, frequency values of each of said plurality of mining chips, mine pooling data, temperature values of each of said plurality of hashboards, temperature values of each of said plurality of mining chips, mining efficiency values, power consumption values, error percentages, operating costs, coin price, cooling fan speeds, fan duty, and percentage fees.

3. The method of claim 2, wherein said processor executes said computer-executable instructions to further generate a widget menu including a list of widgets comprising an average hash rate widget, a power widget, a temperature widget, a hashboard widget, a temperature chart widget, a hash rate chart widget, an error widget, a pools widget, a fans widget, an efficiency widget, a devfee widget, a best-share widget, and a foundblocks widget.

4. The method of claim 3, wherein upon establishing communication between said cryptocurrency miner and said user device, said processor initiating an auto process for automatically selecting a plurality of widgets from a widget library based on hardware data of said cryptocurrency miner, each of said plurality of widgets selected corresponding to metric data associated with each hardware data, said selected plurality of widgets rendered on said display of said user device such that at least two of said selected widgets are simultaneously viewable on said display.

5. The method of claim 4, wherein said hardware data comprises information associated with each of said plurality of hash boards, information associated with each of said plurality of mining chips, data comprising a total number of said plurality of mining chips employed, or type or model of said cryptocurrency miner.

6. The method of claim 3, wherein said cryptocurrency miner receives communication from said user device to instruct said processor to retrieve a plurality of widgets selected by an authenticated user from said widget menu, generate a customized dashboard screen with a layout of said retrieved plurality of widgets, and render said customized dashboard including said layout of said retrieved plurality of widgets on said display associated with said user device based, said metric data associated with said retrieved plurality of widgets being displayed in real time.

7. The method of claim 6, wherein said cryptocurrency miner receives an optional communication from said user device to instruct said processor to perform a drag and drop process where said user selects any of said plurality of widgets provided in said customized dashboard screen, drags any of said selected widgets within a layout configuration of said dashboard screen, and drops said selected plurality of widgets in position within the layout configuration of said dashboard screen.

8. The method of claim 7, wherein said customized dashboard screen is simultaneously saved as a customized dashboard file in said computer-readable medium, or exported onto an external device, onto external memory, or onto a cloud-based management system.

9. The method of claim 8, wherein said cryptocurrency miner receives communication from said user device to instruct said processor to initiate a cloning process to clone said customized dashboard screen, said cloning process providing a cloning menu including a list of cloning options comprising an action function, a pool setting function, a security function, and a user interface function.

10. The method of claim 9, where the cloning process further includes the steps of receiving from said user device a range of internet protocol addresses each associated with a cryptocurrency miner defining a group of miners, selectively configuring pool mining information, an operation state, a time zone, an interface language, and an appearance theme, and providing a dashboard layout setting to clone sizes and layout positions of said plurality of widgets provided in said customized dashboard screen.

11. The method of claim 10, where the cloning process includes the step of generating a cloned customized dashboard file comprising said customized dashboard screen, and transferring said cloned customized dashboard file to a computer-readable memory in each of said cryptocurrency miners provided in said group of cryptocurrency miners, or exporting said cloned customized dashboard file to an external device that is operated to subsequently renders said cloned customized file to each cryptocurrency miner provided in said group of cryptocurrency miners.

12. The method of claim 11, wherein said cloning process further includes the step of generating a cloning result screen, said cloning result screen accessible by said user device to view confirmation that each of said cryptocurrency miner listed in said group of miners has received said transferred cloned customized dashboard file.

13. The method of claim 1, wherein said computer-executable instructions are executed by said processor to cause the processor to generate a graphic user interface comprising a system screen accessible by said user device and navigated by a user to set new passwords, configure network settings, back-up configuration settings of miners, restore configuration settings of miners, reset miner firmware, set time zones, set desired language, and configure appearance attributes of the graphical user interface.

14. The method of claim 1, wherein said computer-executable instructions are executed by said processor to cause the processor to generate a graphic user interface comprising a diagnostic report screen readily receiving documented subject matter entered by users and related to the operational status of said cryptocurrency miner, said processor generating said documented diagnostic report, and selectively exporting said generated diagnostic report to an external device upon initiation of said user.

15. The method of claim 1, wherein said dashboard screen includes a data log operator initiated by users to display said metric data in real time, said metric data displayed in an expanded log window such that said metric data that is generated with a most recent time of day is displayed at a bottom end of said expanded log window and sequentially scrolls upwards within said expanded log window as subsequent metric data is generated in accordance with a most recent time of day.

16. A non-transitory computer-readable medium storing thereon computer-executable instructions that, when executed by a processor in communication with a cryptocurrency miner including a plurality of hash boards each having a plurality of mining chips, causes the processor to generate a dashboard screen including a plurality of widgets, each of said plurality of widgets corresponding to dynamic data associated with operational parameters of said cryptocurrency miner, establish communication between said cryptocurrency miner and a user device over a communication network, and render said dashboard screen including a layout of said plurality of widgets on a display associated with said user device, said dynamic data being displayed in real time-, wherein said plurality of widgets includes at least a first widget comprising a hash rate value, and a second widget, said first widget and said second widget arranged adjacent each other, and simultaneously viewable on said display.

17. The non-transitory computer-readable medium of claim 16, wherein said dynamic data comprises any of voltage values of each of said plurality of mining chips, frequency values of each of said plurality of mining chips, mine pooling data, temperature values of each of said plurality of hashboards, temperature values of each of said plurality of mining chips, mining efficiency values, power consumption values, error percentages, operating costs, coin price, cooling fan speeds, fan duty, and percentage fees.

18. The non-transitory computer-readable medium of claim 17, wherein said processor executes said computer-executable instructions to further generate a widget menu including a list of widgets comprising an average hash rate widget, a power widget, a temperature widget, a hashboard widget, a temperature chart widget, a hash rate chart widget, an error widget, a pools widget, a fans widget, an efficiency widget, a devfee widget, a bestshare widget, and a found-blocks widget.

19. The non-transitory computer-readable medium of claim 18, wherein upon establishing communication between said cryptocurrency miner and said user device, said processor initiating an auto process for automatically selecting a plurality of widgets from a widget library based on hardware data of said cryptocurrency miner, each of said plurality of widgets selected corresponding to dynamic data associated with each hardware data, said selected plurality of widgets rendered on said display of said user device such that at least two of said selected widgets are simultaneously viewable on said display.

20. The non-transitory computer-readable medium of claim 18, wherein said cryptocurrency miner receives communication from said user device to cause said processor to retrieve a plurality of widgets selected by an authenticated user from said widget menu, generate a customized dashboard screen with a layout of said retrieved plurality of widgets, and render said customized dashboard including a layout of said retrieved plurality of widgets on said display associated with said user device.

21. The non-transitory computer-readable medium of claim 20, wherein said cryptocurrency miner processor receives communication from said user device, at a user's request, to instruct said processor to perform a drag and drop process where said user selects any of said plurality of widgets provided in said customized dashboard screen, drags any of said selected widgets within a layout configuration of said dashboard screen, and drops said selected plurality of widgets in position within the layout configuration of said dashboard screen.

22. The non-transitory computer-readable medium of claim 21, wherein said customized dashboard screen is simultaneously saved as a customized dashboard file in said computer-readable medium, or exported onto an external device, onto external memory, or onto a cloud-based management system.

23. The non-transitory computer-readable medium of claim 22, wherein said cryptocurrency miner further receives communication from said user device to instruct said processor to initiate a cloning process to clone said customized dashboard screen, said cloning process providing a cloning menu including a list of cloning options comprising an action function, a pool setting function, a security function, and a user interface function.

24. The non-transitory computer-readable medium of claim 23, where the cloning process includes the steps of receiving from said user device user input defining a range of internet protocol addresses each associated with a cryptocurrency miner defining a group of miners, selectively configuring pool mining information, an operation state, a time zone, an interface language, and an appearance theme, and providing a dashboard layout setting to clone sizes and layout positions of said plurality of widgets provided in said customized dashboard screen.

25. The non-transitory computer-readable medium of claim 24, where the cloning process includes the step of generating a cloned customized dashboard file comprising said customized dashboard screen, and transferring said cloned customized dashboard file to a memory of each of said cryptocurrency miners provided in said group of miners, or exporting said cloned customized dashboard file to an external device that subsequently renders said cloned customized file to memory of each cryptocurrency miner provided in said group of miners.

26. The non-transitory computer-readable medium of claim 25, wherein said cloning process further includes the step of generating a cloning result screen, said cloning result screen accessible by said user device to view confirmation that each of said cryptocurrency miners listed in said group of miners received said transferred cloned customized dashboard file.

27. The non-transitory computer-readable medium of claim 18, wherein said computer-executable instructions are executed by said processor to cause the processor to generate a graphic user interface comprising a system screen accessible by said user device and navigated by a user to set new passwords, configure network settings, back-up configuration settings of miners, restore configuration settings of miners, reset miner firmware, set time zones, set desired language, and configure appearance attributes of said dashboard screen.

28. The non-transitory computer-readable medium of claim 18, wherein said computer-executable instructions are executed by said processor to cause the processor to generate a graphic user interface comprising a diagnostic report screen readily receiving documented subject matter entered by users, and related to the operational status of said cryptocurrency miner, said processor generating said documented diagnostic report, and selectively exporting said generated diagnostic report to an external device upon initiation of a user.

29. The non-transitory computer-readable medium of claim 18, wherein said dashboard screen includes a data log operator initiated by users to display said dynamic data in real time, said dynamic data displayed in an expanded log window such that dynamic data generated with a most recent time of day is displayed at a bottom end of said expanded log window and sequentially scrolls upwards within said expanded log window as subsequent dynamic data is generated in accordance with a most recent time of day.

30. The non-transitory computer-readable medium of claim 18, further comprising the step of determining display attributes of said user device, said display attributes comprising first display attributes associated with a laptop or desktop computer, second display attributes associated with an electronic tablet, and third display attributes associated with a mobile phone, said display attributes also selectable from said widget menu by said users via, said user device, said first, second, and third display attributes comprising any of size or dimension of display of user device, pixel density of display, scaling, resolution of display, or a meta viewpoint value provided in a control program employed by said user device.

31. The non-transitory computer-readable medium of claim 30, wherein the step of rendering includes rendering said dashboard screen including a layout of said plurality of widgets on said display associated with said user device based on said display attributes.

32. A method of monitoring and managing a cryptocurrency miner including a processor in communication with memory, and a plurality of hashboards each having mining chips thereon, said method comprising the steps of:

storing computer-executable instructions is said memory, that when executed by said processor, causes the processor to generate a graphic user interface comprising a dashboard interface;

outputting from said processor a layout of a plurality of widgets provided in said dashboard interface, each of said plurality of widgets comprising metric data, in real time, corresponding to one or more operational parameters of said cryptocurrency miner;

establishing communication between said cryptocurrency miner and a user device including a display over a communication network; and rendering said dashboard interface including said layout of said plurality of widgets on said display based on display attributes of said user device, at least two of said plurality of widgets arranged adjacent each, and simultaneously viewable on said display.

33. The method of monitoring and managing a cryptocurrency miner of claim 32, wherein said metric data comprises any of hashrate values, voltage values of each of said plurality of mining chips, frequency values of each of said plurality of mining chips, mine pooling data, temperature values of each of said plurality of hashboards, temperature values of each of said plurality of mining chips, mining efficiency values, power consumption values, error percentages, operating costs, coin price, cooling fan speeds, fan duty, and percentage fees.

34. The method of monitoring and managing a cryptocurrency miner of claim 33, wherein said processor executes said computer-executable instructions to further generate a widget menu including a list of widgets comprising an average hash rate widget, a power widget, a temperature widget, a hashboard widget, a temperature chart widget, a hash rate chart widget, an error widget, a pools widget, a fans widget, an efficiency widget, a devfee widget, a best-share widget, and a foundblocks widget.

35. The method of monitoring and managing a cryptocurrency miner of claim 34, wherein said cryptocurrency miner further receives communication from said user device to instruct said processor to retrieve a plurality of widgets selected by a user from said widget menu, generate a customized dashboard interface with a layout of said retrieved plurality of widgets, and render said customized dashboard interface including said layout of retrieved plurality of widgets on said display.

36. The method of monitoring and managing a cryptocurrency miner of claim 35, wherein said cryptocurrency miner further receives communication from said user device to instruct said processor to initiate a cloning process to clone said customized dashboard interface, said cloning process including the steps of: receiving from a user a range of internet protocol addresses each associated with a cryptocurrency miner defining a group of miners, providing a cloning option menu for selectively configuring pool mining information, an operation state of each cryptocurrency identified in said range, a time zone, an interface language, and an appearance theme, providing a dashboard layout setting to clone sizes and layout positions of said plurality of widgets, generate a cloned dashboard file comprising said customized dashboard interface, and transferring said generated cloned dashboard file to each of said cryptocurrency miners provided in said group of miners to render said customized dashboard interface on each of said miner in said group of miners, or exporting said generated cloned dashboard file to an external device.

37. The method of monitoring and managing a cryptocurrency miner of claim 36, wherein said cloning process further includes a step of generating a cloning result screen, said cloning result screen accessible by said user device to view confirmation that each of said cryptocurrency miner listed in said group of miners has received said transferred cloned dashboard file.

38. The method of monitoring and managing a cryptocurrency miner of claim 32, wherein said computer-executable instructions are executed by said processor in communication with said cryptocurrency miner, to cause the processor to generate a diagnostic report screen for users to enter document subject matter related to an operational status of said cryptocurrency miner, said processor generating and saving said documented diagnostic report, and selectively exporting said generated diagnostic report to an external device upon initiation of said user.

39. The method of monitoring and managing a cryptocurrency miner of claim 32, wherein said dashboard interface includes a data log operator initiated by users to display said metric data in an expanded log window such that metric data generated with a most recent time of day is displayed at a bottom end of said expanded log window and sequentially scrolls upwards within said expanded log window as subsequent metric data is generated in accordance with a most recent time of day.

40. A system for customizing and cloning a graphic user interface to monitor metric data of a mining machine including a plurality of hash boards each having a plurality of mining chips, said system comprising:

a cryptocurrency mining machine configured to communicate with a remote device over a communication network, said cryptocurrency mining machine including at least one processor in communication with memory, said processor executing instructions stored in said memory to perform: generating a graphic user interface comprising a dashboard interface including a layout of a plurality of widgets each of said plurality of widgets associated with metric data of said cryptocurrency mining machine, establishing communication between said cryptocurrency mining machine and said remote device including a display, rendering said dashboard interface on said display, customizing said dashboard interface by selecting a plurality widgets from a widget menu generated from said processor where said processor reconfigures said dashboard interface to generate a customized dashboard interface with a layout of said selected plurality of widgets, saving said customized dashboard interface, initiating a cloning process to clone at least one customized dashboard interface to create a cloned dashboard file, transferring the cloned dashboard file to one or more predetermined groups of cryptocurrency mining machines, or to an external device accessible by each of said predetermined group of cryptocurrency miners, and rendering data representative of the cloned dashboard file to a processor on said remote device to produce a screen shot of said cloned dashboard interface including said layout of said plurality of widgets on said display of said remote device when communicating with any cryptocurrency miner of said predetermined group of cryptocurrency mining machines.

41. The system of claim 40, wherein said plurality of widgets comprises a hash rate widget, a power consumption widget, a temperature value widget, a hash board widget, a temperature chart widget, a hash rate chart widget, an error widget, a pools widget, a fans speed widget, an efficiency widget, a devfee widget, a bestshare widget, and a foundblocks widget.

42. The system of claim 41, wherein said metric data corresponds to operational parameters of said mining machine when mining digital currency, said metric data comprising any of hash rate values, voltage values of each of said plurality of mining chips, frequency values of each of said plurality of mining chips, mine pooling data, temperature values of each of said plurality of hashboards, temperature values of each of said plurality of mining chips, mining efficiency values, power consumption values, actual, estimated, or measured power values, error percentages, cooling fan speeds, fan duty, and percentage fees.

43. The system of claim 42, wherein said one or more predetermined groups of cryptocurrency mining machines comprises a first group of cryptocurrency mining machines defined by a range of internet protocol addresses preselected by users, each internet protocol address associated with each cryptocurrency mining machine in said first group of cryptocurrency mining machines.

44. The system of claim 42, wherein said cloning process includes receiving from said remote device a range of internet protocol addresses each associated with a mining machine defining a group of mining machines, providing a cloning option menu for selectively configuring pool mining information, an operation state, a time zone, an interface language, and an appearance theme, and providing a dashboard layout setting for users to clone sizes and layout positions of said plurality of widgets.

45. The system of claim 44, wherein said cloning process further includes the step of generating a cloning result screen, said cloning result screen accessible by said remote device to view confirmation that each of said mining machines provided in said group of mining machines has received said cloned dashboard file.

46. The system of claim 44, further including rendering said data representative of the cloned dashboard file to a processor on said remote device to produce a screen shot of said cloned dashboard interface including said layout of said plurality of widgets on said display of said remote device based on said display attributes of said remote device.

* * * * *